United States Patent
Brocato

(10) Patent No.: US 10,860,163 B1
(45) Date of Patent: Dec. 8, 2020

(54) GENERATING USER INTERFACE FOR VIEWING DATA RECORDS

(71) Applicant: BioFortis, Inc., Columbia, MD (US)

(72) Inventor: Mark Brocato, Ellicott City, MD (US)

(73) Assignee: BIOFORTIS INC., Columbia, MD (US)

( * ) Notice: Subject to any disclaimer, the term of this patent is extended or adjusted under 35 U.S.C. 154(b) by 687 days.

(21) Appl. No.: 15/078,656

(22) Filed: Mar. 23, 2016

Related U.S. Application Data

(62) Division of application No. 13/251,248, filed on Oct. 1, 2011, now Pat. No. 9,335,885.

(51) Int. Cl.
*G06F 3/0481* (2013.01)
*G06F 3/0482* (2013.01)
*G06F 16/901* (2019.01)
*G06F 16/904* (2019.01)

(52) U.S. Cl.
CPC .......... *G06F 3/0481* (2013.01); *G06F 3/0482* (2013.01); *G06F 16/904* (2019.01); *G06F 16/9024* (2019.01)

(58) Field of Classification Search
CPC .......... G06F 3/0484; G06F 7/00; G06F 17/30; G06F 3/0481; G06F 16/9038; G06F 16/904; G06F 3/0482; G06N 5/02; H01L 39/22; H04N 5/93
See application file for complete search history.

(56) References Cited

U.S. PATENT DOCUMENTS

| | | | |
|---|---|---|---|
| 5,701,460 A | 12/1997 | Kaplan et al. | |
| 6,105,018 A | 8/2000 | Demers et al. | |
| 6,615,207 B1 | 9/2003 | Lawrence | |
| 6,868,525 B1 * | 3/2005 | Szabo | G06Q 30/02 715/738 |

(Continued)

FOREIGN PATENT DOCUMENTS

EP 1286276 A1 2/2003

OTHER PUBLICATIONS

Wikipedia article on "Graph Database" Sep. 2015.*

(Continued)

*Primary Examiner* — Steven P Sax
(74) *Attorney, Agent, or Firm* — John Maldjian; Maldjian Law Group LLC

(57) ABSTRACT

According to an example embodiment, a computer-implemented method may include receiving a query for information from a data set, wherein the query, regardless of any specific syntax with which the query is defined, can be represented logically by a query graph having a plurality of vertices, wherein at least a first vertex includes a first variable that can be used to select a first subset of records within the data set that correspond to a value of the first variable. The method may also include generating, by at least one processor of a computing system, a browsable user interface to select information in the data set based on the vertices of the query graph, the browsable user interface including a first parameter node corresponding to the first vertex, wherein selection of the first parameter node displays a plurality of first value nodes representing different subsets of records that correspond to different values of the first variable of the first vertex.

12 Claims, 22 Drawing Sheets

(56) References Cited

U.S. PATENT DOCUMENTS

| | | | |
|---|---|---|---|
| 7,168,035 B1* | 1/2007 | Bell | G06F 40/14 715/234 |
| 7,260,579 B2 | 8/2007 | Keith, Jr. | |
| 7,461,077 B1 | 12/2008 | Greenwood | |
| 7,536,410 B2* | 5/2009 | Wong | G06F 3/0482 |
| 7,546,602 B2 | 6/2009 | Hejlsberg et al. | |
| 7,761,591 B2 | 7/2010 | Graham | |
| 8,103,656 B2* | 1/2012 | Krishnamoorthy | G06F 17/30545 707/713 |
| 8,458,280 B2 | 6/2013 | Hausauer et al. | |
| 8,650,226 B2 | 2/2014 | Bobick et al. | |
| 2002/0010679 A1 | 1/2002 | Felsher | |
| 2002/0087585 A1* | 7/2002 | Rising, III | H04N 21/84 |
| 2002/0111932 A1* | 8/2002 | Roberge | G16H 40/63 |
| 2002/0194196 A1* | 12/2002 | Weinberg | G06F 16/258 |
| 2003/0120682 A1* | 6/2003 | Bestgen | G06F 17/30436 |
| 2004/0107125 A1 | 6/2004 | Guheen et al. | |
| 2004/0230917 A1* | 11/2004 | Bales | G06F 3/0481 715/854 |
| 2005/0097480 A1* | 5/2005 | Care | G06F 3/0481 715/859 |
| 2005/0120006 A1* | 6/2005 | Nye | G06F 16/954 |
| 2005/0223384 A1 | 10/2005 | Klingman | |
| 2006/0150119 A1 | 7/2006 | Chesnais et al. | |
| 2006/0212833 A1* | 9/2006 | Gallagher | G06T 11/206 715/848 |
| 2006/0253431 A1 | 11/2006 | Bobick et al. | |
| 2007/0208762 A1 | 9/2007 | Lunt et al. | |
| 2007/0294230 A1* | 12/2007 | Sinel | G06F 16/34 |
| 2008/0034406 A1 | 2/2008 | Ginter et al. | |
| 2008/0097816 A1* | 4/2008 | Freire | G06Q 10/063 705/7.26 |
| 2008/0104542 A1* | 5/2008 | Cohen | G06F 16/951 715/810 |
| 2008/0116449 A1* | 5/2008 | Macready | B82Y 10/00 257/31 |
| 2008/0218519 A1* | 9/2008 | Coury | G06T 11/206 345/440 |
| 2008/0276171 A1* | 11/2008 | Sabo | G06F 16/168 715/711 |
| 2009/0063517 A1* | 3/2009 | Wright | G06F 16/54 |
| 2009/0171708 A1 | 7/2009 | Bobak et al. | |
| 2009/0172603 A1* | 7/2009 | Young Suk Lee | G06F 16/9027 715/854 |
| 2009/0228253 A1 | 9/2009 | Tolone et al. | |
| 2010/0199223 A1* | 8/2010 | Colner | G06F 16/26 715/853 |
| 2010/0241595 A1 | 9/2010 | Felsher | |
| 2010/0241629 A1* | 9/2010 | Tatemura | G06F 17/30557 707/741 |
| 2010/0287512 A1* | 11/2010 | Gan | G06F 16/26 715/854 |
| 2010/0295856 A1 | 11/2010 | Ferreira et al. | |
| 2010/0318583 A1* | 12/2010 | Cohen | G06F 17/30392 707/805 |
| 2011/0191303 A1* | 8/2011 | Kaufman | G06F 7/00 707/684 |
| 2012/0072316 A1 | 3/2012 | Baumann | |
| 2012/0110515 A1* | 5/2012 | Abramoff | G06F 16/904 715/854 |
| 2012/0158416 A1* | 6/2012 | Brunswig | G06Q 10/10 705/1.1 |
| 2012/0158639 A1* | 6/2012 | Moore | G06F 17/30533 706/55 |
| 2012/0159487 A1 | 6/2012 | Bates | |
| 2012/0260236 A1 | 10/2012 | Basak et al. | |
| 2012/0317518 A1* | 12/2012 | Wittig | G06T 11/206 715/853 |
| 2013/0151499 A1 | 6/2013 | Karayel et al. | |

OTHER PUBLICATIONS

Restriction Requirement received for U.S. Appl. No. 13/251,248, dated Nov. 14, 2014, 6 pages.
Response to Restriction Requirement for U.S. Appl. No. 13/251,248, filed on Jan. 14, 2015, 1 page.
Non-Final Office Action Received received for U.S. Appl. No. 13/251,248, dated May 8, 2015, 12 pages.
Response to Non-Final Office Action for U.S. Appl. No. 13/251,248, filed on Jul. 30, 2015, 17 pages.
Final Office Action mailed received for U.S. Appl. No. 13/251,248, dated Aug. 28, 2015, 15 pages.
Response to Final Office Action for U.S. Appl. No. 13/251,248, filed on Oct. 30, 2015, 17 pages.
Advisory Action Received received for U.S. Appl. No. 13/251,248, dated Nov. 12, 2015, 4 pages.
Response to Final Office Action for U.S. Appl. No. 13/251,248, filed on Nov. 23, 2015, 17 pages.
Notice of Allowance Received received for U.S. Appl. No. 13/251,248, dated Dec. 24, 2015, 10 pages.

* cited by examiner

| record | year ID | birth country | birth year | bats |
|--------|---------|---------------|------------|------|
| 0 | 1936 | USA | 1874 | L |
| 1 | 1936 | USA | 1880 | R |
| 2 | 1936 | USA | 1886 | R |
| 3 | 1937 | USA | 1887 | R |
| 4 | 1937 | USA | 1895 | L |
| 5 | 1938 | USA | 1892 | R |
| . | . | . | . | . |
| . | . | . | . | . |
| . | . | . | . | . |
| . | . | . | . | . |

Records 108

Demographics

| Person | Gender | Drug taken (Identified by code number) | | | | | Reactions | | |
|---|---|---|---|---|---|---|---|---|---|
| | | 1 | 2 | 3 | 4 | 5 | Adema | Card Fail | Pneumonia |
| 0 | M | 0 | 0 | 1 | 0 | 1 | 0 | 0 | 1 |
| 1 | M | 1 | 0 | 0 | 0 | 0 | 1 | 0 | 0 |
| 2 | F | 0 | 0 | 1 | 0 | 0 | 0 | 0 | 1 |
| 3 | M | 0 | 0 | 0 | 0 | 0 | 0 | 0 | 0 |
| 4 | F | 1 | 0 | 1 | 0 | 0 | 1 | 1 | 1 |
| 5 | M | 0 | 1 | 1 | 0 | 0 | 0 | 1 | 0 |
| 6 | F | 0 | 0 | 0 | 0 | 1 | 0 | 0 | 0 |

FIG. 7A

| Name | Drugs Code Number |
|---|---|
| Aspirin | 1 |
| Botox | 2 |
| Codeine | 3 |
| Dextrose | 4 |
| Ephedrine | 5 |

FIG. 7B

Reactions
Adema
Cardiac Failure
Pneumonia

FIG. 7C

Demographics
Drug taken (Identified by code number)    Reactions

| Person | Gender | 1 | 2 | 3 | 4 | 5 | Adema | Card Fail | Pneumonia |
|---|---|---|---|---|---|---|---|---|---|
| 0 | M | 0 | 0 | 1 | 0 | 1 | 0 | 0 | 1 |
| 1 | M | 1 | 0 | 0 | 0 | 0 | 1 | 0 | 0 |
| 2 | F | 0 | 0 | 1 | 0 | 0 | 0 | 0 | 1 |
| 3 | M | 0 | 0 | 0 | 0 | 0 | 0 | 0 | 0 |
| 4 | F | 1 | 0 | 1 | 0 | 0 | 1 | 1 | 1 |
| 5 | M | 0 | 1 | 1 | 0 | 0 | 0 | 1 | 0 |
| 6 | F | 0 | 0 | 0 | 0 | 1 | 0 | 0 | 0 |

FIG. 7D

Demographics
Drug taken (Identified by code number)    Reactions

| Person | Gender | 1 | 2 | 3 | 4 | 5 | Adema | Card Fail | Pneumonia |
|---|---|---|---|---|---|---|---|---|---|
| 0 | M | 0 | 0 | 1 | 0 | 1 | 0 | 0 | 1 |
| 1 | M | 1 | 0 | 0 | 0 | 0 | 1 | 0 | 0 |
| 2 | F | 0 | 0 | 1 | 0 | 0 | 0 | 0 | 1 |
| 3 | M | 0 | 0 | 0 | 0 | 0 | 0 | 0 | 0 |
| 4 | F | 1 | 0 | 1 | 0 | 0 | 1 | 1 | 1 |
| 5 | M | 0 | 1 | 1 | 0 | 0 | 0 | 1 | 0 |
| 6 | F | 0 | 0 | 0 | 0 | 1 | 0 | 0 | 0 |

FIG. 7E

Demographics
Drug taken (Identified by code number)    Reactions

| Person | Gender | 1 | 2 | 3 | 4 | 5 | Adema | Card Fail | Pneumonia |
|---|---|---|---|---|---|---|---|---|---|
| 0 | M | 0 | 0 | 1 | 0 | 1 | 0 | 0 | 1 |
| 1 | M | 1 | 0 | 0 | 0 | 0 | 1 | 0 | 0 |
| 2 | F | 0 | 0 | 1 | 0 | 0 | 0 | 0 | 1 |
| 3 | M | 0 | 0 | 0 | 0 | 0 | 0 | 0 | 0 |
| 4 | F | 1 | 0 | 1 | 0 | 0 | 1 | 1 | 1 |
| 5 | M | 0 | 1 | 1 | 0 | 0 | 0 | 1 | 0 |
| 6 | F | 0 | 0 | 0 | 0 | 1 | 0 | 0 | 0 |

FIG. 7F

GENERATING USER INTERFACE FOR VIEWING DATA RECORDS

RELATED APPLICATION

This application is a division of U.S. application Ser. No. 13/251,248, filed Oct. 1, 2011, entitled "Generating User Interface for Viewing Data Records", which is hereby incorporated by reference in its entirety.

TECHNICAL FIELD

This description relates to data visualization and, in particular, to generating a user interface for viewing data records.

BACKGROUND

Persons may desire to view data in a browsable hierarchy to see relationships between records in a data set. The structure of a hierarchy of data may be tied to the structure of the storage of the data. This structure may not provide the user with a hierarchy which is helpful to understand the data.

SUMMARY

According to one general aspect, a computer-implemented method may include receiving a query for information from a data set, wherein the query, regardless of any specific syntax with which the query is defined, can be represented logically by a query graph having a plurality of vertices, wherein at least a first vertex includes a first variable that can be used to select a first subset of records within the data set that correspond to a value of the first variable. The method may also include generating, by at least one processor of a computing system, a browsable user interface to select information in the data set based on the vertices of the query graph, the browsable user interface including a first parameter node corresponding to the first vertex, wherein selection of the first parameter node displays a plurality of first value nodes representing different subsets of records that correspond to different values of the first variable of the first vertex.

According to another general aspect, a non-transitory computer-readable storage medium may include computer executable code stored thereon. The code, when executed by at least one processor, may be configured to cause a computing system to receive a query for information from a data set, the query being represented logically by a query graph having a plurality of vertices, wherein at least a first vertex includes a first variable that can be used to select a first subset of records within the data set that correspond to a value of the first variable. The code may also be configured to cause the computing system to generate a browsable user interface to select information in the data set based on the vertices of the logical query graph, the browsable user interface including a first parameter node corresponding to the first vertex, wherein selection of the first parameter node displays a plurality of first value nodes representing different subsets of records that correspond to different values of the first variable of the first vertex.

According to another general aspect, a computer-implemented method may include receiving, by at least one processor of a computing system, a data set including multiple records, each of the records including multiple attributes. The method may also include receiving a query for information from the data set, wherein the query is represented logically by a query graph having a plurality of vertices associated with the data set, the plurality of vertices including at least a first vertex associated with a first variable that can be used to select a first subset of records within the data set that correspond to a value of the first variable and a second vertex associated with a second variable that can be used to select a second subset of records within the data set that correspond to a value of the second variable. The method may also include generating a browsable user interface based on the plurality of vertices and associated variables. The browsable user interface may include at least one first level parameter node corresponding to the first vertex, the at least one first level parameter node representing the first variable associated with the first vertex; for each first level parameter node, a number of associated first level value nodes corresponding to a number of different values which a first subset of the multiple records have for the first variable, wherein each of the first level value nodes represents one of the different values for the first variable, the first level value nodes are visible or hidden based on input from a user of the browsable user interface, and the browsable user interface is configured to receive a selection from the user of one or more of the first level value nodes; for each of the selected first level value nodes, at least one associated second level parameter node corresponding to the second vertex, the at least one second level parameter node representing the second variable associated with the second vertex; and for each second level parameter node, a number of associated second level value nodes corresponding to a number of different values for the second variable which a second subset of the multiple records have for the second variable, wherein the second subset includes at least some of the multiple records which are associated with the value represented by the first level value node with which the second level value node is associated via the second level parameter node, each of the second level value nodes represents one of the different values for the second variable, and the second level value nodes are visible or hidden based on input from the user.

According to another general aspect, a non-transitory computer-readable storage medium may include computer executable code stored thereon. The code, when executed by at least one processor, may be configured to cause a computing system to receive a data set including multiple records, each of the records including multiple attributes. The code may also be configured to cause the computing system to receive a query for information from the data set, wherein the query is represented logically by a query graph having a plurality of vertices associated with the data set, the plurality of vertices including at least a first vertex associated with a first variable that can be used to select a first subset of records within the data set that correspond to a value of the first variable and a second vertex associated with a second variable that can be used to select a second subset of records within the data set that correspond to a value of the second variable. The code may also be configured to cause the computing system to generate a browsable user interface based on the plurality of vertices and associated variables. The browsable user interface may include at least one first level parameter node corresponding to the first vertex, the at least one first level parameter node representing the first variable associated with the first vertex; for each first level parameter node, a number of associated first level value nodes corresponding to a number of different values which a first subset of the multiple records have for the first variable, wherein each of the first level value nodes represents one of the different values for the first variable, the first level value nodes are visible or hidden based on input from a user of the browsable user interface, and the browsable user interface is configured to receive a selection from the user of one or more of the first level value nodes; for each of the selected first level value nodes, at least one associated second level parameter node corresponding to the second vertex, the at least one second level parameter node representing the second variable associated with the second vertex; and for each second level parameter node, a number of associated second level value nodes corresponding to a number of different values for the second variable which a second subset of the multiple records have for the second variable, wherein the second subset includes at least some of the multiple records which are associated with the value represented by the first level value node with which the second level value node is associated via the second level parameter node, each of the second level value nodes represents one of the different values for the second variable, and the second level value nodes are visible or hidden based on input from the user.

The details of one or more implementations are set forth in the accompanying drawings and the description below. Other features will be apparent from the description and drawings, and from the claims.

BRIEF DESCRIPTION OF THE DRAWINGS

FIG. 7A is an example table showing demographic records stored in a database and values for attributes included in the records according to an example embodiment.

FIG. 7B is an example table showing drug records stored in a database and values for attributes included in the records according to an example embodiment.

FIG. 7C is an example table showing reaction records stored in a database according to an example embodiment.

FIG. 7D shows the example table of FIG. 7A with demographic records selected based on a selection of gender according to an example embodiment.

FIG. 7E shows the example table of FIG. 7A with demographic records selected based on a selection of gender and a selection associated with the drug records according to an example embodiment.

FIG. 7F shows the example table of FIG. 7A with demographic records selected based on a selection of gender, and selections associated with drug records and reaction records according to an example embodiment.

DETAILED DESCRIPTION

Figure 1:
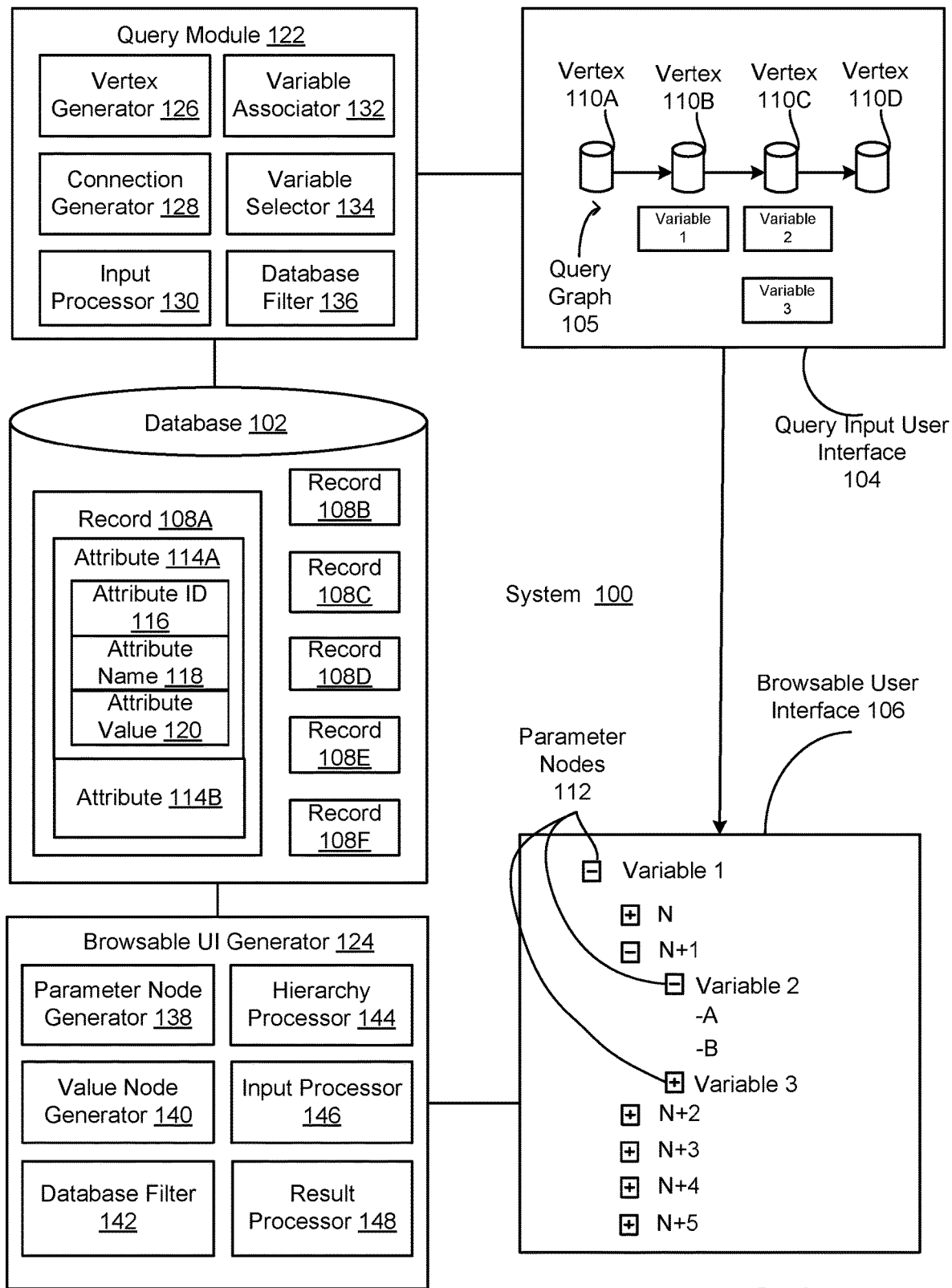
FIG. 1 is a diagram of a system for deriving a browsable hierarchy.

In business intelligence applications, a user may wish to browse the contents of a database. A hierarchical representation of the contents may assist in visualizing the relationships between the contents of the database. The hierarchy may have higher-level branches or nodes, which include the contents of the lower-level branches or nodes, and optionally a summary of the properties of lower-level branches, and the lower-level branches or nodes may represent specific combinations of variables of records included in the contents of the database.

A user may present query variables to query the database for information. The query variables may be features, parameters, or values of the contents of the database upon which the user requests operations, such as filtering operations, to be performed. A user may want to examine similar datasets that can be derived by changing values of one or more query variables, or by removing one or more operations that made up an original query.

The user may wish to define and browse his or her own unique hierarchies to represent the contents of the database without having to modify or copy the structure of the data in the database. The user may further wish to construct the hierarchy based on queries defined by the user. The user may define the queries based on a user interface, such as a graphical user interface (GUI) or text-based or console interface, or by providing a file with data defining the queries to a computer system, according to example embodiments.

As described herein, the user may provide a query to a system, and may define which parts of the query are to be treated as variables that can be used to guide the generation of multiple nodes within the resulting hierarchy. The system may implement a process that generates the hierarchy based on the structure of the query, such as the order of variables selected by the user or included in a file read by the system, rather than based on the structure of the underlying data. Thus, the hierarchy may be independent of the structure of the underlying data. Each independent variable, or combination of dependent variables, may become a branching point in the hierarchy, creating branches or nodes in the hierarchy, which show the records in the database with different combinations of values for the selected variables, allowing the user to observe the impact that each combination of variable values has on intermediate result sets returned by execution of all the queries, as well as the effect of selections of different values for variables in the queries. The system may thereby allow users to define (and redefine) multiple browsable hierarchies in a quick, low-cost manner.

As described herein, a query graph may represent a query for information from a data set. The query may be independent of the structure or records in the data set. The data set may be logically organized in an entity, attribute, value model, and the query may be based on variable values for attributes of records in a data set. In various implementations, other data models also can be used, and the techniques described herein are not limited to any particular data model. The data set may include multiple records, which may each include values for multiple attributes of the records. The data set may include, for example, different entities, or types of records; each entity may be associated with multiple attributes, and records which have the same entity type may have values for the same attributes.

The query graph may include multiple vertices. In some implementations, the vertices may represent an entity type or data set (or subset thereof) upon which operations will be performed. In some implementations, vertices of the query graph may represent variable values of attributes for records of the data set, and in such implementations a query graph vertex may be said to include a "variable," because the vertex corresponds to a variable value of a data set attribute. A variable may be associated with a vertex of a query graph, and may specify an operation in which records with different values for an attribute are filtered from a data set. A value for an attribute may correspond to a value defined for a variable. The query graph may include directional indicia, such as edges, which may indicate a relationship or ordering between the vertices.

The query graph may be used to generate a browsable user interface. The browsable user interface may include a user interface that allows a user to navigate a hierarchy of records included in the data set, and the browsable user interface may be generated based on the query represented by the query graph. The browsable user interface may include nodes. The nodes may include parameter nodes that are associated with, and/or that represent, variables within the query graph. The nodes may also include value nodes, which are associated with and/or represent records which are subsets of the data set, and which have a same value for a variable represented by a preceding parameter node.

FIG. 1 is a diagram of a system 100 for deriving a browsable hierarchy with data sets and subsets thereof. The browsable hierarchy, having been derived as described herein, may include nodes branching from each other, and may allow a user to select nodes so as to view the nodes branching therefrom, and to view the records represented by the nodes, in more detail.

A user of the system 100 may define which parts of the query have non-fixed values within the query graph. Variables in the query graph with non-fixed values may include variables associated with the records in the data set. The variables may be associated with the records in the data set by records in the data set including values for attributes associated with the variables, or by values for the variables being derived from the records in the data set, such as sums, differences, products, or averages of values for the attributes. A variable in the query graph can correspond to different groups (or subsets) of records from the data set, where the different groups have different values for an attribute that corresponds to the variable of the query graph. The different groups of records having the different variable values may be displayed as value nodes within the browsable hierarchy or browsable user interface. The different or non-fixed values of the variable represented in the query graph may be associated, within the browsable user interface, with multiple branches from common parameter nodes, as discussed below.

Variables in the query graph may be represented in the browsable hierarchy by parameter nodes from which value nodes branch. Value nodes represent data records having different values stored or derived from the underlying data sets, given the combination of the variables and operations in the query graph. The structure of the hierarchy may be based on the variables defined by the user, rather than based on any intrinsic organizational structure of the underlying data. The hierarchy may be generated based on a query that is logically represented as a directed graph of data operations defined by the user, starting with one or more root vertices and ending with one or more destination vertices. Such data operations include definitions of variables associated with one or more vertices. This logical graph is referred to as a "Query Graph". The system 100 may thereby allow the user to define and redefine multiple browsable hierarchies by selecting and changing the placement of the non-fixed variables in the query graph. The query graph, with its definition of variables, drives the generation of the resulting browsable hierarchy. Each subsequent operation in the query graph may be dependent on each prior operation, such as by filtering records from the database based on previous filtering operations or selections of values.

The system 100 may derive a hierarchy according to user-specified variables used to extract information from the data set. The variables may be specified via a user interface, by a file read by the system 100, or other means of generating or processing a query that represents relationships between the variables for the purpose of generating the browsable hierarchy. For example, the user may specify variables by which the system 100 should filter data records, and then show a tree-shaped or tree-based hierarchy based on the filtering.

The system 100 may include a database 102. The database 102 may include a disk or other memory device included in a single computing device, or may include a memory system distributed through a network of resources such as a set of web service endpoints or flat files, according to example embodiments. The database 102 may include multiple records 108 (shown in FIG. 1 as Record 108A, 108B, 108C, 108D, 108E, 108F, but referred to in the plural hereinafter as records 108). Each of the records 108 may include multiple attributes 114 (shown in FIG. 1 as Attribute 114A, 114B, but referred to in the plural as attributes 114). The multiple attributes 114 of the records 108 may include values, such as numerical or quantitative values upon which quantitative operations such as addition, subtraction, multiplication, division, or ranking may be performed, or string values, based upon which categories may be assigned, according to example embodiments.

Each of the attributes 114 of the records 108 may be associated with an Attribute ID 116 that may include the combination of characters that the software and/or system 100 uses to refer to the attribute 114 (for example, the Attribute ID 116 may be an attribute name used in source code), an Attribute Name 118, which may include a combination of characters presented to the user by the system 100, such as via a query input user interface 104 and/or browsable user interface 106, to indicate the name of the attribute 114, and an Attribute Value 120 that may include a value associated with the attribute 114.

A query graph 105 shown in FIG. 1 may be considered a mathematical or logical representation of a parameterization of a subset of the data set, thereby representing a query for a subset of information from the data set. The query input user interface 104 shown in FIG. 1 may be considered a user interface by which a query may be inputted into the system 100 thereby allowing a user to generate the query represented by the query graph 105, according to example embodiments. The system 100 may read the query that the user generated using the query input user interface 104. Or, the system 100 may receive a file that includes the query. Note that the construction of logical query graphs may be accomplished by different methods, such as by using an actual physical or visual graphical representation of the logical graph, or by a tabular or form-based representation, or by a textual representation, as non-limiting examples. When "query graph" is used in this document, it may refer to a logical query graph, and not necessarily any physical implementation or visual representation which is described above, and can be accomplished via various means.

The Attribute Value 120 may include, for example, a nominal identifier such as a name or type, an ordinal attribute such as a rank, or numerical or quantitative values, according to example embodiments. An example of the records 108, with multiple attributes, is shown in FIG. 2A.

Figures 2A, 2B:
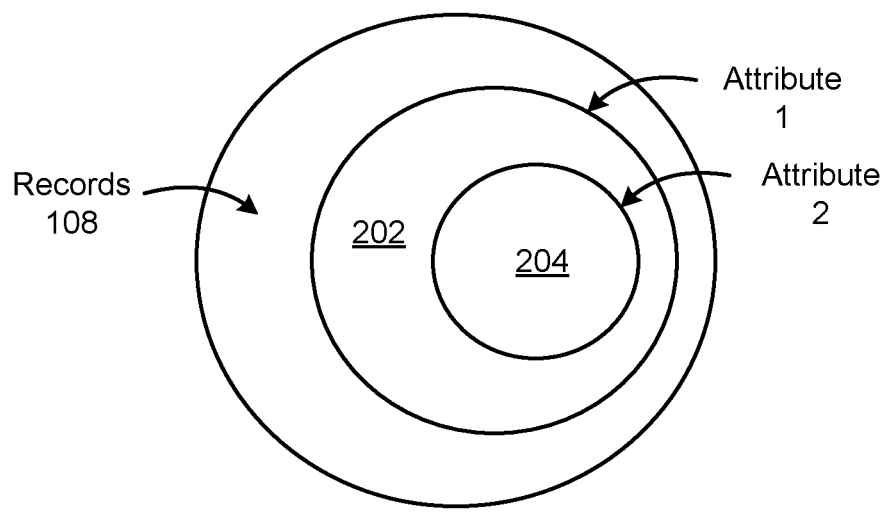
FIG. 2A is an example table showing records stored in a database and values for attributes included in the records according to an example embodiment.
FIG. 2B shows an example of a Venn diagram illustrating filtering of the records.

FIG. 2A is an example table showing records 108 stored in the database 102 and the attributes 114 (not labeled in FIG. 2A) included in each of the records 108 according to an example embodiment. In this example, the records 108 represent information about professional baseball players. FIG. 2 shows records 0-5. However, many more records 108 may be included in the database 102 and the associated table.

FIG. 2A also shows attributes 114 for each of the records 108. The table shown in this example includes the attribute ID 116 (not labeled in FIG. 2A) for each of the attributes, namely, yearID, birthCountry, birthYear, and bats, which represent, respectively, a year in which a player was inducted into the Hall of Fame, a country of birth for the player, a year of birth for the player, and whether the player batted left-handed or right-handed. The records 108 each correspond to professional baseball players. The table also includes the Attribute Value 120 (not labeled in FIG. 2A) for the attributes 114 associated with each of these records 108, but does not indicate the Attribute Name 116 for each of the attributes 114 associated with the records 108. The association between the attribute ID 116 and the Attribute Name 118 for each attribute 114 may be one-to-one, and the system 100 may store the association between the attribute ID 116 and the Attribute Name 118 for each attributes 114 in the database 102. A selection of attributes, and filtering based on the selection, will be described below with respect to FIGS. 4, 5A, 5B, 5C, 5D, 5E, 5F, and 5G.

The records 108 may be filtered according to the attributes specified by the user. FIG. 2B shows an example of a Venn diagram, illustrating the filtering of the records 108. This diagram is not necessarily drawn to scale. In this example, the records 108 may be filtered according to attributes, such as Attribute 1 and Attribute 2. In this example, the records 108 may have been filtered according to Attribute 1, and a first subset 202 of the records 108, which have the same value (or values) for Attribute 1 are represented by the circle pointed to by Attribute 1. This filtering may create the first subset 202 of the records 108. The first subset 202, which may include the records 108 which have a specified value (or values) for the Attribute 1, may include less than all of the records 108. The first subset 202 may also be filtered according to a second attribute, labeled Attribute 2. The Attribute 1 and Attribute 2 may correspond to the Variable 1 and Variable 2, respectively, described with reference to FIG. 1. A second subset 204 may include less than all of the records in the first subset 202, and may include the records within the first subset 202 which also have a specified value (or values) for the Attribute 2.

Returning to FIG. 1, the system 100 may read and/or receive a query, which may be represented by a logical query graph 105, and use the query to generate a browsable user interface 106. The query may be read from a received file, or be generated from a query input user interface 104 that may include a user interface with icons or images physically representing vertices of the logical query graph 105, edges between vertices of the query graph 105, and selected attributes associated with the vertices of the query graph 105. In the example in which the system includes the query input user interface 104, the query input user interface 104 may be text-based, form-based, or may include a graphical user interface (GUI) that allows a user to select, drag, and/or drop icons into the user interface to generate the query graph 105 representing the query which the system 100 uses to generate the browsable user interface 106.

The query input user interface 104 and/or browsable user interface 106 may provide output to the user via, for example, a display, such as a liquid crystal display (LCD), plasma screen, or light-emitting diode (LED) display, and may receive input from the user via a human interface device (HID) such as, for example, a mouse, keyboard, or touchscreen. The query input user interface 104 and/or browsable user interface 106 may also use other means of input and output from and to the user.

The system 100 may include a query input module 122 and a browsable user interface generator 124, which correspond to, and/or are associated with, the query graph 105 and browsable user interface 106, respectively. The query module generator 122 and browsable user interface generator 124 may be implemented by software executed by a processor of the system 100. A user may provide input to the system 100 via the query input user interface 104, or the query represented by the query graph 105 (which may or may not be displayed to the user) may be inputted to the system 100 by transfer of a file, and the system 100 may respond by the query module generator 122 generating a user interface (either graphical or not) that reflects the logical query graph 105 for display on the query input user interface 104, where the query input user interface 104 specifies or defines attributes and interrelationships of the attributes according to which filtering of the records 108 will take place to create the browsable hierarchy in the browsable user interface 106 based on the filtering. The query graph 105 shown in the query input user interface 104 may represent an ordered set of operations that are performed on the records 108 in the database 102. The query graph 105 actually may be displayed on a screen for viewing and/or manipulation by the user within the query input user interface 104, or may simply be an abstract representation of the relationships between the attributes within the query, which may not be seen by a user, according to example embodiments.

The browsable user interface 106 may include nodes that provide results based on the browsable user interface generator 124 filtering the records 108 stored in the database 102 according to the query specified by the query input user interface 104. The browsable user interface 106 may include a separate node for each independent variable, and may include combined nodes for each group of dependent variables. Independent variables are discussed below. The user may interact with the query input user interface 104 to generate the hierarchy that will be displayed in the browsable user interface 106, and may interact with the browsable user interface 106 to view different parts of the browsable hierarchy. The hierarchy shown in the browsable user interface 106, of which a partial example including the parameter node 112 and value nodes N, N+1, N+2, N+3, N+4, and N+5, are shown in FIG. 1, may represent all possible combinations of attribute values 120 for attributes 114 assigned to the query graph 105 generated in the query input user interface 104.

The query graph 105 may include a plurality of vertices 110A, 110B, 110C, 110D. The vertices 110A, 110B, 110C, 110D may represent operations performed on the records 108 in the database 102 based on specified variables. The operations may, for example, include Structured Query Language (SQL) queries, or may be defined using other structured languages such as Statistical Analysis System (SAS) or Business Process Execution Language (BPEL). Each of the operations represented by the vertices 110A, 110B, 110C, 110D may include one or more attributes 114 that may be selected and/or modified by the user, or may be defined by other means, such as a file read by the system 100, according to example embodiments.

Any or all of the vertices 110A, 110B, 110C, 110D may receive input from the user. While vertices 110A, 110B, 110C, 110D are shown in FIG. 1, this is merely an example, and any number of vertices 110A, 110B, 110C, 110D may be included in the query graph 105. The number of vertices 110A, 110B, 110C, 110D may be predetermined based on the number of attributes 114 in the records 108, or may be determined by the user or by information or data read by the system 100. For example, the user may provide commands to the query input user interface 104 to add vertices 110A, 110B, 110C, 110D to the query graph 105, or delete vertices from the query graph 105.

The input received from the user may include one or more variables for each vertex 110A, 110B, 110C, 110D or for only some (less than all) of the vertices 110A, 110B, 110C, 110D. The vertices 110A, 110B, 110C, 110D may, for example, display drop-down menus to the user, from which the user may select one or more variables. The variables inputted into, or selected from, the vertices 110A, 110B, 110C, 110D may be associated with attributes 114 of the records 108, or the variables may be derived from the records 108 while not being directly stored in the records 108. In the example shown in FIG. 1, the user has selected Variable 1 for vertex 110B (which may be associated with a first attribute 114 of records 108 stored in the database 102), and has selected Variable 2 and Variable 3 (which may be associated with second and third attributes 114 of records 108 stored in the database 102) for vertex 110C. However, the user may select any number (or none) of variables for each vertex 110A, 110B, 110C, 110D, according to various example embodiments.

The query graph 105 may include directional indicia, such as arrows or edges, connecting the vertices 110A, 110B, 110C, 110D. The directional indicia may indicate an order in which the system 100 will perform the operations represented by the vertices 110A, 110B, 110C, 110D, such as by pointing in a direction in which filtering (or other operations) by the selected variables will take place. For example, the vertex 110A may be considered a "root vertex" which represents all of the records 108, and the vertices 110B, 110C, 110D may be considered "downstream vertices" which branch or extend from the root vertex or input vertex 110A. The filtering at each of the downstream vertices 110B, 110C, 110D based on the selected variables may result in subsets (e.g., 202, 204) which are smaller than (i.e., include fewer records 108), or no larger than, a preceding vertex 110A, 110B, 110C at each subsequent downstream vertex. The subsets generated based on the selected variables may be subsets of the upstream vertices 110A, 110B, 110C, or the subsets may be independently generated for each vertex. In example embodiments, operations such as "union" or "combine columns," which may increase length and width, respectively, of the subsets of records 108 compared to upstream vertices, may cause the subsets represented by some vertices to be larger than upstream vertices. For example, two upstream vertices may be combined or joined into one downstream vertex, and the downstream vertex may then represent a larger subset than either of the upstream vertices which were combined into the downstream vertex.

The system 100 may implement the query graph 105 (and/or the query input user interface 104) by calling the query module 122. The query module 122 may generate the query graph 105 on a display of the system 100, and may receive input from the user via the display of the system 100 or via other input devices such as a mouse and/or keypad, or the query module generator 122 may generate the query graph 105 as relationships between variables without necessarily displaying the query graph 105 as a visual graph to the user.

The query module generator 122 may include a vertex generator 126. The vertex generator 126 may generate the vertices 110A, 110B, 110C, 110D in response to user input, such as the user dragging and dropping icons into the query input user interface 104, or by the user entering predetermined keyboard keys or characters (or combinations of characters) to insert or generate a vertex 110A, 110B, 110C, 110D. The query module 122 may also include a connection generator 128. The connection generator 128 may generate the connections or edges between the vertices 110A, 110B, 110C, 110D, such as by adding the directional indicia or arrows between the vertices 110A, 110B, 110C, 110D. The user may, for example, drag-and-drop the connections onto the query input user interface 104, or may utilize a feature of the query input user interface 104 which allows the user to snap connections between the vertices 110A, 110B, 110C, 110D, and decide the direction of the directional indicia or edges.

Alternatively, rather than generating the query graph 105 using the graphical query input user interface 104 shown in FIG. 1 and described above, the query module generator 122 may enable the user to generate a query graph using a form-based query interface. In an example form-base query interface, the vertices may be represented by text boxes or other user interface controls. A user may explicitly input or define connectors indicating the order or relationships between the vertices, or the order may be implicitly determined by the order in which the user places the vertices onto the user interface of the various user interface controls (i.e., vertices which the user places later in time may be considered downstream vertices from vertices which the user places earlier in time), or based on relative locations of the vertices, according to example embodiments.

The query module 122 may also include an input processor 130. The input processor 130 may receive and process the input received from the user. For example, the input processor 130 may receive and process the input or instructions from the user to generate a vertex 110A, 110B, 110C, 110D, add a connection or edge between vertices 110A, 110B, 110C, 110D, and select attributes 114 for the vertices 110A, 110B, 110C, 110D.

The query input module 122 may also include a variable associator 132. The variable associator 132 may associate variables with each of the vertices 110A, 110B, 110C, 110D generated in the query graph 105 in the query input user interface 104 based on user input or other means such as data read from a file. The variable associator 132 may make the variables available for selection by the user at each of the vertices 110A, 110B, 110C, 110D based, for example, on the association of variables with the attributes 114 of the records 108 in the database 102. The query module 122 may include a variable selector 134 which may cause the query input user interface 104 to present, to the user, the variables 114 that the variable associator 132 associated with each of the vertices 110A, 110B, 110C, 110D. The variable selector 134 may also cause the query input user interface 104 to receive, from the user, a selection of one or more of the associated variables. In the example shown in FIG. 1, the variable selector 134 has received, from the user, a selection of Variable 1 for vertex 110B, and selections of Variable 2 and Variable 3 for vertex 110C.

The query module 122 may also include a database filter 136. The database filter 136 may filter records 108 from the database 102 based on selections and inputs made by the user at the query input user interface 104, or based on receiving a query by other means such as a file read by the system 100. The database filter 136 may, for example, communicate with the variable associator 132 to cause variables which have been selected for one vertex 110A, 110B, 110C, 110D to not be associated with, or available for selection at, the remaining vertices 110A, 110B, 110C, 110D. This may prevent variables which have already been selected for association with one vertex 110A, 110B, 110C, 110D from being selected for another vertex 110A, 110B, 110C, 110D, preventing redundancy. In another example embodiment, the variables may be available for selection at, or association with, multiple vertices 110A, 110B, 110C, 110D.

The browsable user interface 106 may include a number of parameter nodes 112 equal to, or a function of, the number of vertices 110A, 110B, 110C, 110D for which the user indicated or selected variables. While one first level parameter node 112 (Variable 1) and two second level parameter nodes 112 (Variable 2 and Variable 3) are included in the browsable user interface 106 shown in FIG. 1, any number of parameter nodes 112 may be included in the browsable user interface 106, based on the selection of variables by the user in the query input user interface 104.

By virtue of the selected variables, the parameter nodes 112 may be associated with one or more of the attributes of the multiple records 108, the associated attribute(s) being used to perform the filtering. For example, a parameter node 112 denoted Variable 1 may be associated with a first attribute, and the records 108 or one of the subsets 202, 204 shown in the example diagram of FIG. 2B, may be filtered based on the first attribute into subsets represented by value nodes represented by a same value node extending from a given parameter node. The records 108 in the subset may have a same value 120 for an attribute 114 associated with the parameter node 112 Variable 1. For a second or subsequent variable selected in the query input user interface 104, multiple subsets represented by value nodes may be possible. For example, one subset may be possible for each different value 120 of the second or subsequent variable.

Each of the first level parameter nodes 112 (of which one, Variable 1, is shown in the browsable user interface 106 shown in FIG. 1) may branch to a number of value nodes equal to or a function of the number of different values 120 of the records 108 associated with the parameter node for the Variable 1, i.e., within the records, the number of value nodes may be equal to or a function of the number of different values 120 of the variable associated with the attribute 114 for the records 108 associated with the parameter node 112. The value nodes may branch from the parameter node(s) 112 in a tree-shaped or tree-based hierarchy.

In the example browsable user interface 106 shown in FIG. 1, the records associated with the parameter node 112 Variable 1 have six values 120 for the Variable 1, namely N, N+1, N+2, N+3, N+4, and N+5. The value node representing the subset associated with the value N+1 has been selected, and the second level parameter node 112 Variable 2 has been selected as a subset of the N+1 value node, with two values (A and B) indicated for this subset. Second level parameter node 112 Attribute 3 is also available for selection, in this example. While these example values 120 for the Variable 2 are sequential, the values 120 need not be sequential, and may include gaps between different values 120 for the Variable 2 if the records 108 associated with the parameter node 112 Variable 2 do not include records 108 with sequential values 120 for the associated Variable 2, according to example embodiments.

The values for the second variable, N, N+1, N+2, N+3, N+4, N+5, may themselves create subsets with downstream value nodes, extending from either of the parameter nodes 112 Variable 2 and Variable 3, within the subset N+1 in the example shown in FIG. 1. The value nodes may be associated with, and/or branch out or extend to, additional downstream parameter nodes. For example, if a user selects the value node N+1 (such as by clicking a mouse button with the cursor hovering over the value node N+1), then the records 108 within the associated subset (for which the attribute 114 has the value N+1), may be available for filtering based on additional attributes represented by parameter nodes 112, in this example Variable 2 and Variable 3 based on the variables specified in the query input user interface 104.

Similarly, the user may toggle the browsable user interface 106 between displaying and hiding the value nodes N, N+1, N+2, N+3, N+4, N+5, by hovering the cursor over the parameter node 112 Variable 1, or by clicking on the parameter node 112 Variable 1. Similarly, the user may toggle the browsable user interface 106 between displaying or hiding the second level parameter nodes 112 Variable 2, Variable 3 associated with the value node N+1 by hovering the cursor over, or clicking on, the value node N+1. The user may also toggle the browsable user interface 106 between displaying or hiding the second level value nodes A, B by hovering the cursor over or clicking on the second level parameter node 112 Variable 2, according to example embodiments.

The system 100 may derive nodes for the hierarchy or browsable user interface 106 based on the selections of variables by the user for the vertices 110A, 110B, 110C, 110D in the query input user interface 104. The system 100 may, for example, derive one or more root nodes and child nodes based on the vertices 110A, 110B, 110C, 110D in the query graph 105.

In an example embodiment, the system 100 may include a browsable user interface generator 124. The browsable user interface generator 124 may generate the browsable user interface 106 based on the specification of variables in the query input user interface 104, and based on the records 108 included in the database 102.

The browsable user interface generator 124 may include a parameter node generator 138. The parameter node generator 138 may generate parameter nodes in the browsable user interface 106, such as the parameter nodes 112, based on selections made by the user in the query input user interface 104, or specifications of variable in the query by other means such as reading a file. For example, the browsable user interface generator 124 may generate a parameter node 112 in the browsable user interface 106 for each selection of a variable at a vertex 110A, 110B, 110C, 110D by the user.

The browsable user interface generator 124 may include a value node generator 140. The value node generator 140 may generate one or more value nodes in the browsable user interface 106 for each parameter node 112. The value node generator 140 may, for example, generate one value node (e.g., N, N+1, N+2, N+3, N+4, N+5), for each distinct value of a variable, or combination of multiple variables, associated with the parameter node 112, for the records 108 associated with the parameter node 112. The records 108 associated with the parameter node 112 may include less than all of the records 108 included in the database 102, based, for example, on filtering of the records 108 and/or selection of value and/or parameter nodes at previous nodes in the browsable user interface 106.

The browsable user interface generator 124 may also include a database filter 142. The database filter 142 may filter the records 108 in the database 102 based, for example, on selections of variables made by the user at the vertices 110A, 110B, 110C, 110D. For example, if a value node is selected in the browsable hierarchy, then nodes which are downstream from the selected value node will be associated only with those records 108 that have a value 120 for an attribute 114 associated with the variable equal to (or in a range of) the value represented by the selected value node. Records 108 that do not have the value 120 represented by the selected value node for the associated attribute 114 will be associated with nodes on different branches that are not downstream from the selected value node, according to an example embodiment.

The browsable user interface generator 124 may also include a hierarchy processor 144. The hierarchy processor 144 may generate a hierarchy for display in the browsable user interface 106 based on the selections by the user of variables and vertices 110A, 110B, 110C, 110D in the query input user interface 104. For example, the hierarchy processor 144 may generate a tree-like or tree-shaped hierarchy in which multiple value nodes (e.g., N, N+1, N+2, N+3, N+4, N+5) branch from each parameter node 112, and multiple parameter nodes 112 branch from each value node. The parameter nodes 112 (usually one, but sometimes more than one) that branch from the value node are determined by the attributes defined on the next downstream vertex 110B, 110C, 110D in the query graph 105 that contains at least one variable. The number of parameter nodes may also be less than the number of variables, if multiple variables are pooled or combined into a single parameter node, according to an example embodiment.

The browsable user interface generator 124 may also include an input processor 146. The input processor 146 may process input received from the user via the browsable user interface 106. The input processor 146 may, for example, receive and process inputs or instructions from the user to expand or contract branches or nodes in the browsable user interface 106.

The browsable user interface generator 124 may also include a result processor 148. The result processor 148 may cooperate with the database filter 142 to determine results of operations at the vertices of the query graph 105 and nodes of the browsable user interface 106. The result processor 148 may, for example, determine a number of distinct values 120 of an attribute 114 (or combinations of attribute 114) associated with a variable for records 108 associated with (or represented by) a parameter node 112, and a number of records 108 which share a same value 120 for a value node. The result processor 148 may cause the browsable user interface 106 to display the number of records 108 with each distinct value 120 for the attribute 114. This number may be shown near the value nodes for each distinct value.

Figure 3A:
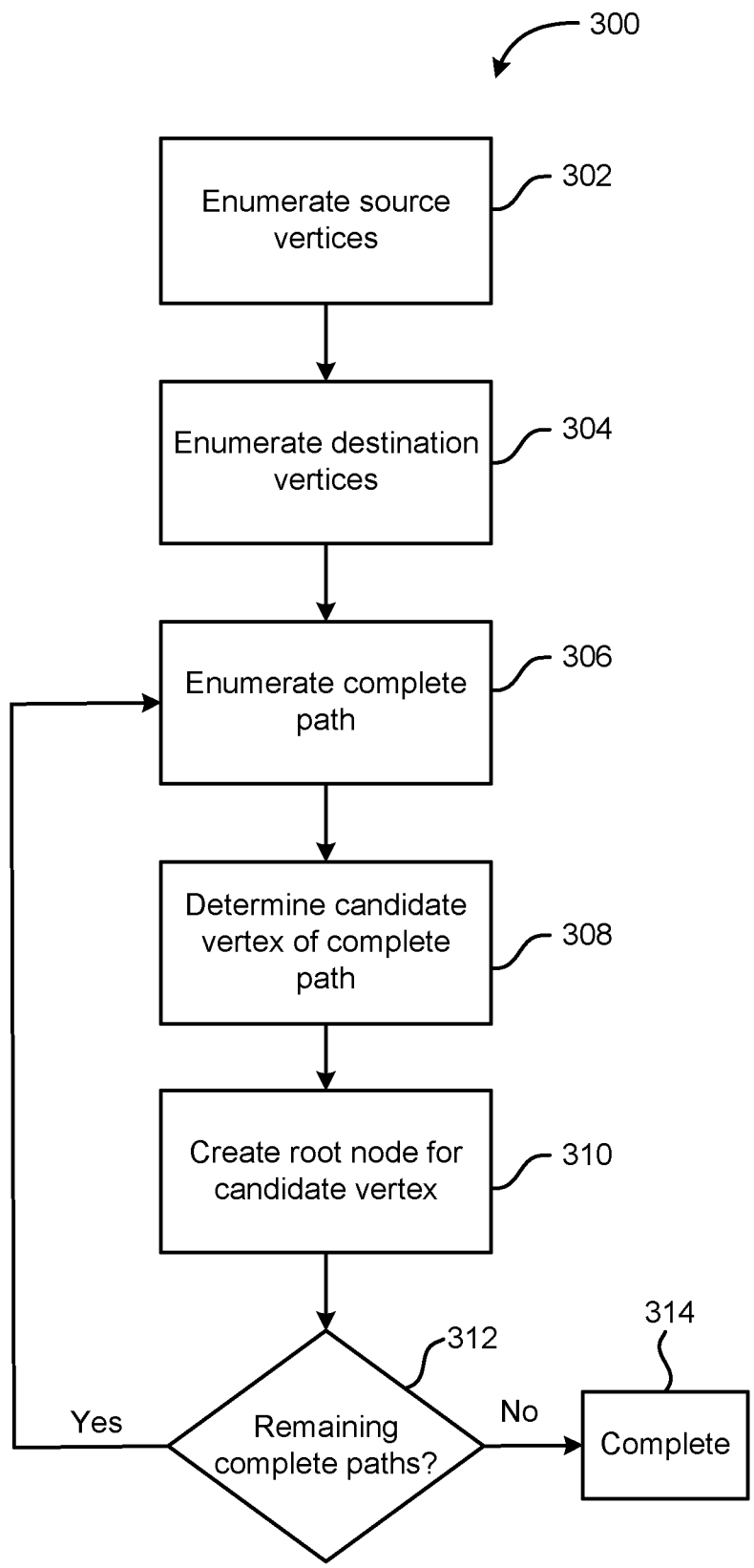
FIG. 3A is a flowchart showing a process for deriving a root node according to an example embodiment.

FIG. 3A is a flowchart showing a process 300 for deriving a root node(s) in the browsable hierarchy according to an example embodiment. The system 100 may perform this process after the user has generated the query graph 105 using the query input user interface 104, or after receiving information or data for generating the query graph 105 by other means (such as after receiving a form-based query which may be logically represented by the query graph 105). In an example embodiment, each vertex 110A, 110B, 110C, 110D in the query graph 105 shown in FIG. 1 may have one outgoing edge connected to a single downstream node (but may have more than one incoming edge connected to an upstream node) and may have a single terminal node, or may have multiple outgoing edges connected to downstream nodes and/or multiple terminal nodes. In the example query graph 105 shown in the query input user interface 104 of FIG. 1, the vertices 110A, 110B, 110C each have one outgoing edge, the vertices 110B, 110C, 110D each have one incoming edge, and the vertex 110D is the terminal vertex. In this example, vertex 110A is upstream from vertices 110B, 110C, and 110D, vertex 110B is upstream from vertices 110C and 110D, and vertex 110C is upstream from vertex 110D. Vertex 110B is downstream from vertex 110A, vertex 110C is downstream from vertices 110A and 110B, and vertex 110D is downstream from vertices 110A, 110B, and 110C.

The system 100 may enumerate all source vertices in the query graph 105 (302). Source vertices may be vertices 110A, 110B, 110C, 110D, with no inbound edges, or no directional indicia (such as arrows) pointing into the vertex indicating that a previous operation has been performed. In the example query graph 105 shown in FIG. 1, the vertex 110A may be considered a source vertex.

The system 100 may also enumerate all destination vertices in the query graph 105 (304). Destination vertices may be vertices 110A, 110B, 110C, 110D with no outbound edges, or no directional indicia (such as arrows) pointing out of the vertex indicating that a subsequent operation will be performed. In the example query graph 105 shown in FIG. 1, the vertex 110D may be considered a destination vertex or terminal vertex. While FIG. 3A shows the enumeration of source vertices (302) being performed before the enumeration of destination vertices (304), this is merely an example, and the enumeration of the destination vertices (304) may be performed before (or concurrently with) the enumeration of the source vertices (302).

After the system 100 has enumerated the source vertices (302) and the destination vertices (304), the system 100 may enumerate a complete path or paths (306). A complete path may include a distinct path between each source vertex and each destination vertex. While the query graph 105 shown in the example query input user interface 104 shown in FIG. 1 includes only one complete path, from the vertex 110A to the vertex 110D, other query graphs, in which there is more than one source vertex and/or more than one destination vertex, may include multiple complete paths. For example, the example query graph 105A shown and described with respect to FIG. 4 includes two complete paths.

After determining at least one complete path (306), the system 100 may determine candidate vertices of the complete path (308). Candidate vertices may be those vertices which are associated with variables. A most upstream candidate vertex may be selected, which may be a first vertex, such as closest to the source vertex along a complete path which has a variable, or a first vertex 110A, 110B, 110C, 110D for which the user selected a variable. For example, in the query graph 105 shown in FIG. 1, the vertex 110B may be considered the candidate vertex of the complete path because the user selected Variable 1 for the vertex 110B, and no variable was selected for the preceding vertex, vertex 110A.

After determining the candidate vertex (308), the system 100 may create a root node in the browsable hierarchy corresponding to the candidate vertex (310). The system 100 may, for example, create the root node in the hierarchy (which will be displayed by the browsable user interface 106) for each independent individual variable or group of variables of a candidate vertex that does not reside on a complete path through a prior vertex containing a variable. The system 100 may, for example, create the root node for an independent group of variables of a given candidate vertex (or vertex 110A, 110B, 110C, 110D) if and only if there is no vertex (or vertex 110A, 110B, 110C, 110D) which is prior to the given candidate vertex and which contains or is associated with a variable.

In an example embodiment, the system 100 may consider a group of variables to be independent if and only if the group of variables is not combined with any of the vertex's 110A, 110B, 110C, 110D other variable groups using a logical AND operation. A variable group may include a single variable, or a set of dependent variables. For example, a compound set of variables, {(P1 AND P2) OR (P3 AND P4) OR P5} has three groups of independent variables. The three groups in this example, which are independent because they are separated by OR operators, are (P1 AND P2), (P3 AND P4), and P5.

After the system 100 has created the root node (310), the system 100 may determine whether there are any more complete paths remaining in the query graph (312). If there are no more complete paths remaining, then the process of determining the root node(s) may be complete (314). If the system determines that there are more complete paths, then the system may enumerate a subsequent complete path (306), determine the candidate vertex of the subsequent complete path (308), and create a root node for the subsequent complete path (310). While the example process 300 shown in FIG. 3A shows the system 100 recursively enumerating a single complete path (306), determining a candidate vertex of the complete path (308), and creating a root node for the candidate vertex (310), the system 100 may also enumerate all of the complete paths at (306), and then perform the determining of the candidate vertices (308) and root nodes (310) either separately or together for each complete path, according to example embodiments.

Figure 3B:
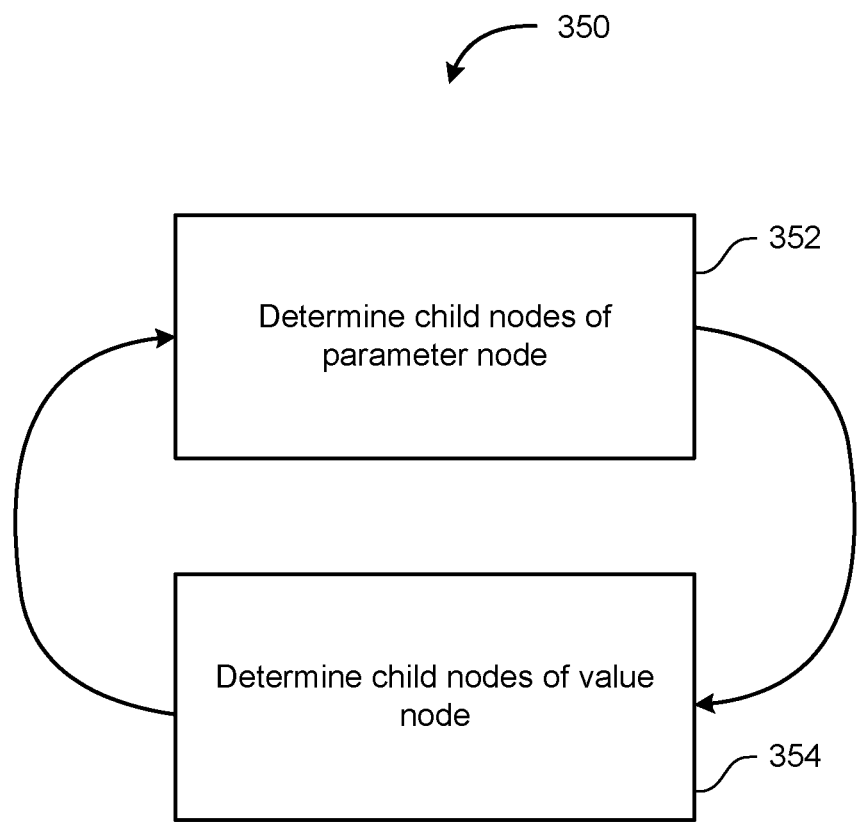
FIG. 3B is a flowchart showing a process for deriving child nodes according to an example embodiment.

FIG. 3B is a flowchart showing a process 350 for deriving child nodes according to an example embodiment. The system 100 may derive child nodes for each node in the browsable hierarchy or browsable user interface 106, starting with the root nodes derived in the process 300 described with respect to FIG. 3A. The system 100 may derive the child nodes according to the process 350 shown in FIG. 3B after deriving the root nodes according to the process shown in FIG. 3A, according to an example embodiment.

The system 100 may define a hierarchy with two types of nodes, namely, "parameter nodes," and, "values nodes". A parameter node may represent a group of variables, and resulting variable values, from a vertex 110A, 110B, 110C, 110D in the query graph 105. For example, a parameter node generated based on vertex 110B may represent Variable 1, and a parameter node based on vertex 110C may represent Variable 2 and Variable 3.

Each of the root nodes derived by the system 100 according to the process 300 shown in FIG. 3A may be parameter nodes. The vertices 110B, 110C shown in the example query graph 105 in FIG. 1 may result in parameter nodes based on the user's selection of variables for these vertices 110B, 110C. Each parameter node may have multiple value nodes branching therefrom, with each of the value nodes representing a distinct value for one of the one or more variable associated with the parameter node. A value node may represent a single value for the variable associated with a parameter node, or, in the case of a parameter associated with multiple variables, a single combination of values for each of the variables associated with the value node.

The system 100 may determine child nodes of a parameter node (352). The child nodes of a parameter node may be value nodes. The system 100 may generate or create a value node for each value or combination of values for the variable(s) represented by the parameter node. These values or combinations of values represented by the value nodes may have been provided to the system a priori (independent of the records 108 stored in the database 102), such as based on items in a drop-down menu selected by the user in the query input user interface 104 used to generate the query graph 105, or may be derived from the records 108 stored in the database 102.

As discussed with respect to the Venn diagram shown in FIG. 2B, the records associated with a given node may include less than all of the records 108 in the database 102. The given node may be associated with less than all of the records 108 because the system 100 has filtered or selected some of the records 108 at nodes which are upstream from, or prior to, the given node. The records 108 associated with the given node may include a finite set of values for the attribute(s) associated with variable(s) for the given node. For a given parameter node, the system 100 may determine or generate a number of child nodes, which may be value nodes, equal to or a function of the number of distinct values for the variable associated with the given parameter node (or in the case of a parameter node associated with multiple variables, a number of child nodes equal to or a function of the number of combinations of values for the variables associated with the given parameter node).

The system 100 may also determine child nodes for each value node (354). The child node of a value node may be a parameter node. The system 100 may find the child node, which may be a parameter node, of a value node, by following the outgoing edge (which may be a directional indicium such as an arrow) of the vertex of the query graph 105 for which the associated variable(s) was used to determine the value node.

For example, in the query graph 105 shown in FIG. 1, the system 100 may determine a parameter node based on the vertex 110B, create a number of child value nodes for this parameter node based on the number of distinct values for the Variable 1 that the records associated with the vertex 110B have, and, for each of these created child nodes, create a child parameter node based on the vertex 110C. The system 100 may recursively create child nodes of the parameter nodes and value nodes until reaching the end of the query graph 105, according to an example embodiment.

Figure 4:
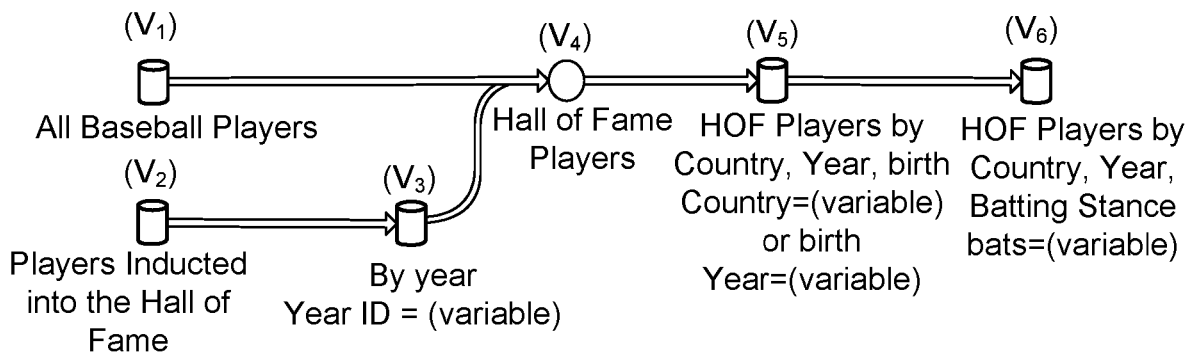
FIG. 4 is a diagram of a query graph generated in a query input user interface according to an example embodiment.

FIG. 4 is a diagram of a query graph 105A representing a query according to an example embodiment. The system 100 may derive the root node(s), as described with respect to FIG. 3A, in the hierarchy or browsable user interface 106A (shown in FIGS. 5A-G) based on the example query graph 105A created by the user with the query input user interface 104 as described above with respect to FIG. 1. This example uses baseball players as examples for the records 108 in the database 102 (shown in FIG. 1). The query graph 105A shown in FIG. 4, which includes vertices V1, V2, V3, V4, V5, V6 (which may have similar features as the vertices shown in the query graph 105 shown in FIG. 1) and directional indicia or arrows pointing from the upstream vertices to the downstream vertices, is used to derive the hierarchy which will be displayed in the browsable user interface 106. The vertices V1, V2, V3, V4, V5, V6, which are examples of the vertices 110A, 110B, 110C, 110D shown in FIG. 1, may be predetermined, or may be selected by the user, such as by using a drag-and-drop interface. In this example with two root vertices V1 and V2, the query graph 105A may represent a set of operations that may represent a database query executed against two tables (or sets of records), namely, professional baseball players at V1, which include attributes such as name, year of birth, and country of birth, and baseball players who were inducted into the Hall of Fame at V2, which include a category of induction (player/manager/umpire), the number of ballots cast, and the year the players were inducted.

In this example, the query graph 105A includes two possible paths of vertices which lead to the set of Hall of Fame players V4. The query graph 105A may include two complete paths which lead through V4. One path is from the table or set of records 108 which includes records for all "Baseball Players," vertex V1. The other path is from the table or set (or subset) of records 108 which includes all records for "Players inducted into the Hall of Fame," vertex V2. Vertex V3, which is downstream from and pointed to by vertex V2, represents only those records in V2 that have a specific yearID value showing the year of induction into the Hall of Fame, or the players inducted into the Hall of Fame in a specific year. The yearID is specified as a variable for vertex V2, allowing a user to select any desired value for yearID to execute the query graph 105.

The vertex V4, representing a subset of the records represented by the vertex V1, includes only those records represented by the vertex V1 which have a corresponding record represented by the vertex V3, or only those players who have been inducted into the Hall of Fame in a specific year. In this example, the user may have selected the yearID attribute in the query input user interface 104 to select only those players who have been inducted into the Hall of Fame, and/or to view players inducted into the Hall of Fame in particular years specified by a value of the yearID variable for vertex V3.

The vertex V5 represents only those records in V4 that have a specific "birthCountry" value OR which have a specific "birthYear" value. The user may have provided input into the vertex V5, selecting as attributes birthCountry (birth country) OR birthYear (birth year). The vertex V5 may then represent only those players who have been inducted into the Hall of Fame in a specific year and were born in either a specific country or a specific year. The birthCountry and birthYear may be specified as independent variables, allowing the user to select any desired values for either or both the birthCountry and birthYear when executing the query graph in the browsable user interface (shown in FIGS. 5A-G), according to an example embodiment.

The vertex V6 represents only those records in V5 which have a specific value for "bats", based on the user's selection of a value for the "bats" variable. Because V5 represents those players who were inducted into the Hall of Fame in a specific year and were either born in a specific country or born in a specific year, V6 represents only those players who have been inducted into the Hall of Fame in a specific year, were born in a specific country or in a specific year, and have a specific batting stance (left-handed or right-handed). These selections of values for variables associated with the vertices V3, V4, V5, V6 determine the filtering attributes and the hierarchy in the browsable user interface 106, shown in FIGS. 5A, 5B, 5C, 5D, 5E, 5F, and 5G.

After the user has selected the values for the variables for each of the vertices, as described above with respect to FIG. 4, the system 100 may produce the hierarchy for display by the browsable user interface 106. An example process for producing the hierarchy may include determining root nodes and determining child nodes.

The root nodes in the hierarchy may be determined by finding the first vertex containing at least one variable for each distinct path through the query graph 105, shown in FIG. 4, from start (V1 or V2) to end (V6). Each operation may correspond to a root node in the hierarchy if and only if there is no prior parameterized operation on the same query graph 105, according to an example embodiment. Thus, if a vertex has no inbound edges, then the corresponding node may be a root node.

The paths through the query graph 105A may be enumerated from start to end. The example shown in FIG. 4 includes two paths. The first path consists of the operations or vertices V1, V4, V5, and V6, and the second path consists of the operations or vertices V2, V3, V4, V5, and V6. The first operation in the path that has at least one variable is determined by the system 100. In the first path, which consists of operations or vertices V1, V4, V5, and V6, the first operation or node that has a variable is V5. In the second path, which consists of the operations or vertices V2, V3, V4, V5, and V6, the first operation or vertex that has a variable is V3. In the example shown in FIG. 4, V3 is selected as the root node because V3 is prior to V5 and a path from V3 to V5 exists. V5 is not the root node because V5 is a descendant of V3, according to an example embodiment.

After the root node(s) has been determined, child nodes may be determined for each root node(s). The child nodes, which may include parameter nodes and/or value nodes, may be derived from those vertices in the query graph that contain at least one variable. The system 100 may recursively derive child nodes for each node in the hierarchy, starting with the root node(s) derived as described above with respect to FIG. 4.

FIGS. 5A, 5B, 5C, 5D, 5E, 5F, and 5G show an example of deriving child nodes for the browsable user interface 106A based on the example selection of variables in the query graph 105A shown in FIG. 4. FIGS. 5A, 5B, 5C, 5D, 5E, 5F, and 5G show the browsable user interface 106A in various states of display based on the user clicking on various nodes to display or hide the child nodes of the node which is clicked on or activated.

Figure 5A:
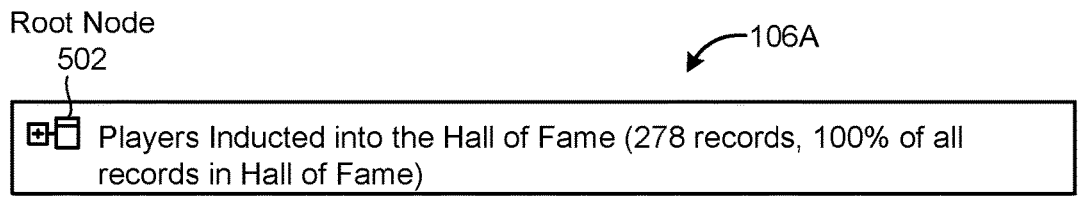
FIG. 5A shows a browsable user interface including a root node representing all players inducted into the Hall of Fame, according to an example embodiment.

FIG. 5A shows the browsable user interface 106A including a root node 502 representing all players inducted into the Hall of Fame, according to an example embodiment. The browsable user interface 106A may include similar features and functionalities as the browsable user interface 106A described above. The root node 502 may indicate the number of records 108 in the data set. In this example, the root node 502 indicates that 278 records are included in the set, or 278 players were inducted into the Hall of Fame.

The root node 502, "Players Inducted into the Hall of Fame," may correspond to the vertex V2 shown in FIG. 4, which, as shown in FIG. 4, represents the table or set of records, "Players Inducted into the Hall of Fame". The '+' sign on the root node 502 indicates that this root node 502 may be further filtered by one or more parameters. The possibility of further filtering may be based on the existence of downstream vertices V3, V4, V5, V6 from V2 in the query graph 105A of FIG. 4. The root node 502 may have a single child node. If the user clicks on, or hovers a cursor over, the root node 502 or the '+' sign associated with the root node 502, the single child node of the root node 502 may be displayed by the second user interface 106.

Figure 5B:
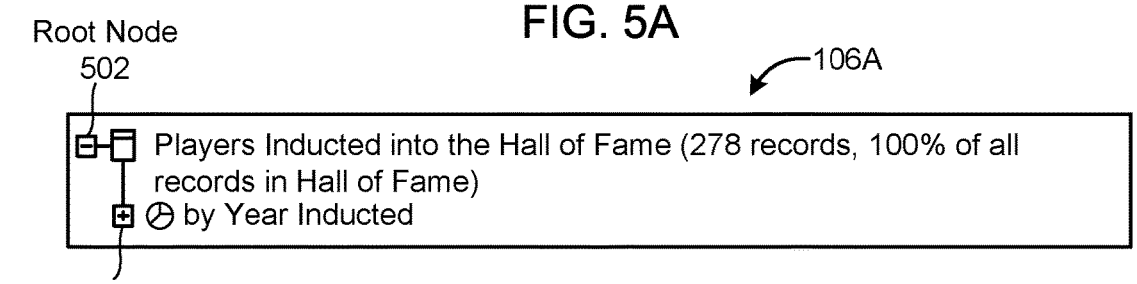
FIG. 5B shows the browsable user interface of FIG. 5A with a single child node, which may include a parameter node, of the root node, according to an example embodiment.

FIG. 5B shows the browsable user interface 106A with a single child node, which may include a parameter node, of the root node 502, according to an example embodiment. The parameter node 504, "by year inducted," may correspond to the vertex V3 shown in FIG. 4. The single child or parameter node 504 may include a variable called, "by Year Inducted," based on the user's selection of the variable Year ID at vertex V3 in the query graph 105A of the query input user interface 104, as described with respect to FIG. 4. The child or parameter node 504 may include a '+' sign indicating that the child parameter node 504 can be filtered into further child nodes, in this example, by year of induction into the Hall of Fame. The possibility of further filtering may be based on the existence of downstream vertices V4, V5, V6 from V2 in the query graph 105A of FIG. 4. The user clicking on, or hovering the cursor over, the '+' sign of the child or parameter node 504, "by Year Inducted," may cause the browsable user interface 106A to display value nodes branching from the child or parameter node 504, each of the branching value nodes corresponding to a year of induction into the Hall of Fame.

Figure 5C:
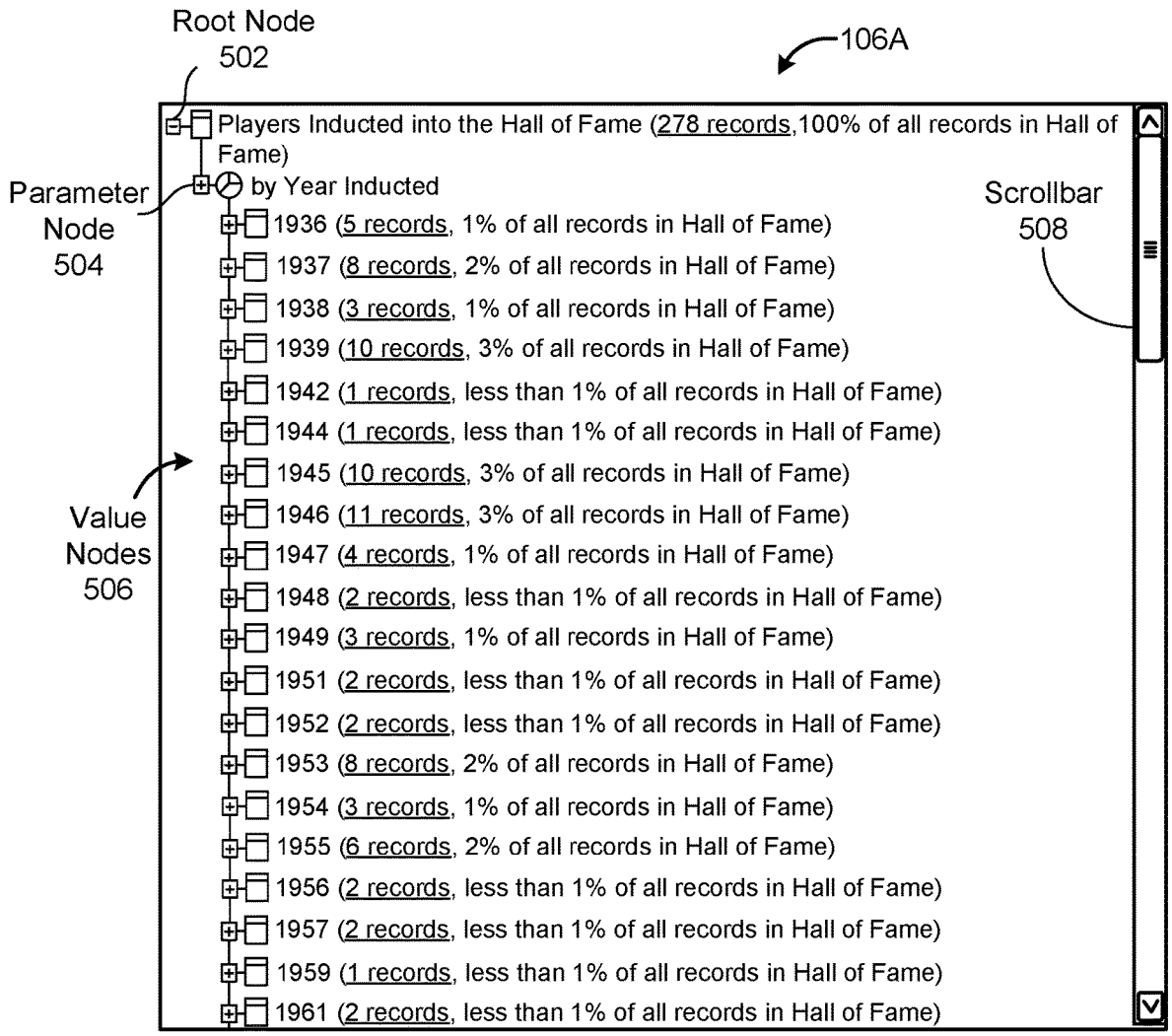
FIG. 5C shows the browsable user interface of FIG. 5A with the value nodes corresponding to specific years of induction branching from a parameter node, "by Year Inducted," according to an example embodiment.

FIG. 5C shows the browsable user interface 106A with the value nodes 506 corresponding to specific years of induction branching from the parameter node 504, "by Year Inducted," according to an example embodiment. In this example, the user may have clicked on, or hovered the cursor over, the parameter node 504, "by Year Inducted," to cause the browsable user interface 106A to show the value nodes 506 corresponding to specific years of induction. The value nodes 506 show values for the Year ID attribute based on the user's selection of Year ID as the variable at vertex V3 in the first user interface 104 (as shown in FIG. 4). Each of the value nodes 506 is a child node of the parameter node 504, "by Year Inducted."

In this example, the value nodes 506 include the years 1936-1961 (with some gaps). The gaps between years (which are automatically determined by the query into underlining the data records 108), such as between 1939 and 1942, indicate that no players were inducted into the Hall of Fame in 1940 or 1941. The scroll bar 508 may be scrolled down to show later years of induction, after 1961, which are not shown on the screen in FIG. 5C. The value nodes 506 may also indicate how many records or players are in the subsets corresponding to, or filtered by, each of the years, thereby showing how many players were inducted in each of the displayed years. A user may click on, or hover the cursor over, any of the value nodes 506 to show the records which include players who were inducted into the Hall of Fame in each of the displayed years.

Given n year value nodes 506, the system 100 may determine child nodes for each year value node 506. To determine the child nodes for each value node 506, the system 100 may perform, for each value node 506, operations determined by the selections at the vertices V4 and V5 in the query graph 105. No variables were selected for vertex V4, so no operations need to be performed based on the vertex V4. At V5, the user selected two independent variables, "birthCountry" and "birthYear." Because the variables, "birthCountry," and "birthYear" are independent, the system 100 generates separate parameter nodes, "birthCountry" and "birthYear," as child nodes for each of the year value nodes 506.

Figure 5D:
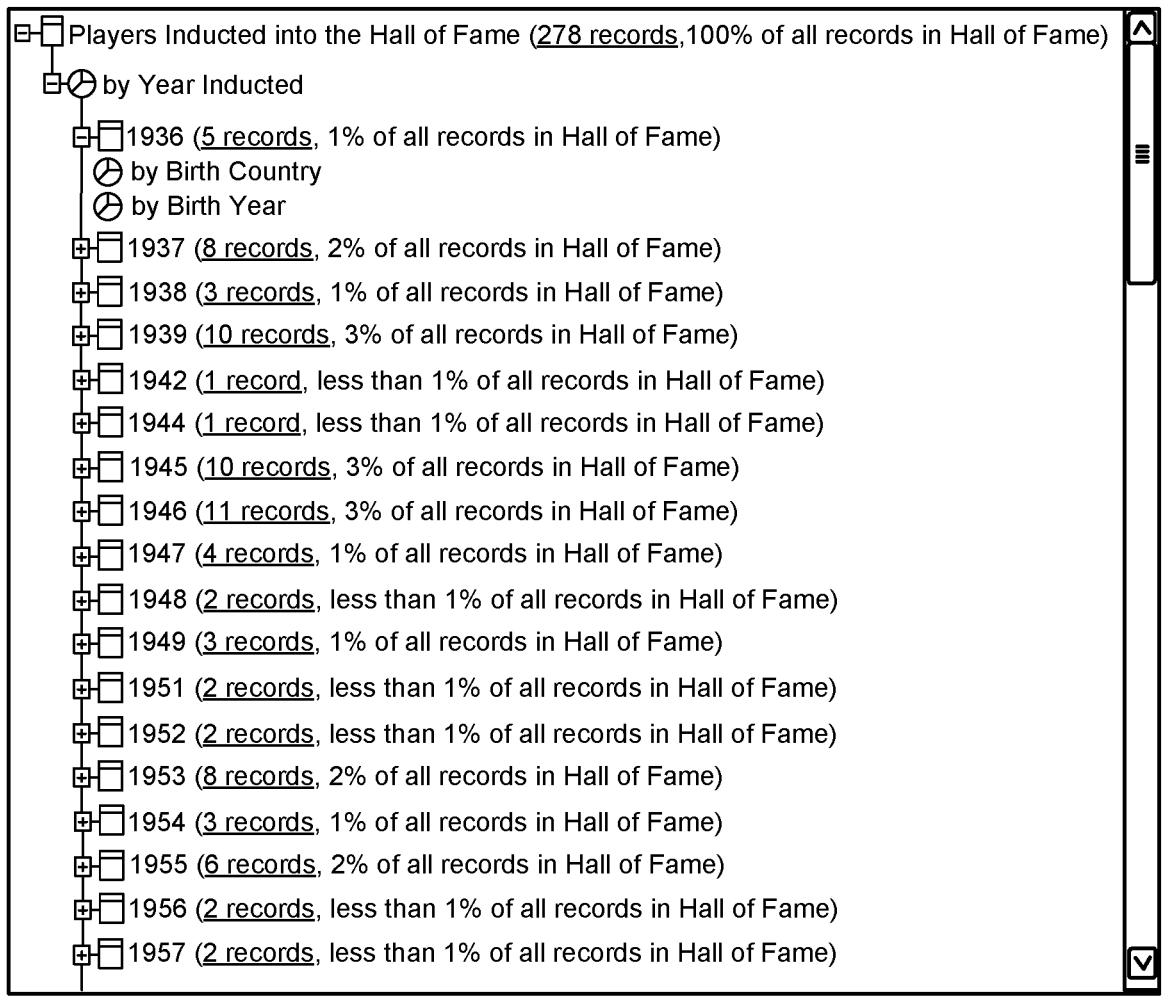
FIG. 5D shows the browsable user interface of FIG. 5A with parameter nodes, "Birth Country" and "Birth Year," as child nodes of a value node for the year 1936, according to an example embodiment.

FIG. 5D shows the browsable user interface 106A with parameter nodes "Birth Country" and "Birth Year" as child nodes of the value node 506 for the year 1936, according to an example embodiment. The system 100 (shown in FIG. 1) may have generated or displayed the parameter nodes "birthCountry" and "birthYear," as child nodes of the value node 506 for the year 1936, in response to the user clicking or hovering the cursor over the value node corresponding to the year 1936. Birth country and birth year may be available to the user as filtering attributes based on the user's selection of birth country and birth year at vertex V5 as variables in the query graph 105A at vertex V5, as shown in FIG. 4. The user may select either "Birth Country" or "Birth Year" (or both) to generate child nodes of either of these nodes, thereby further subdividing (or filtering) the subset of players inducted in 1936.

Figure 5E:
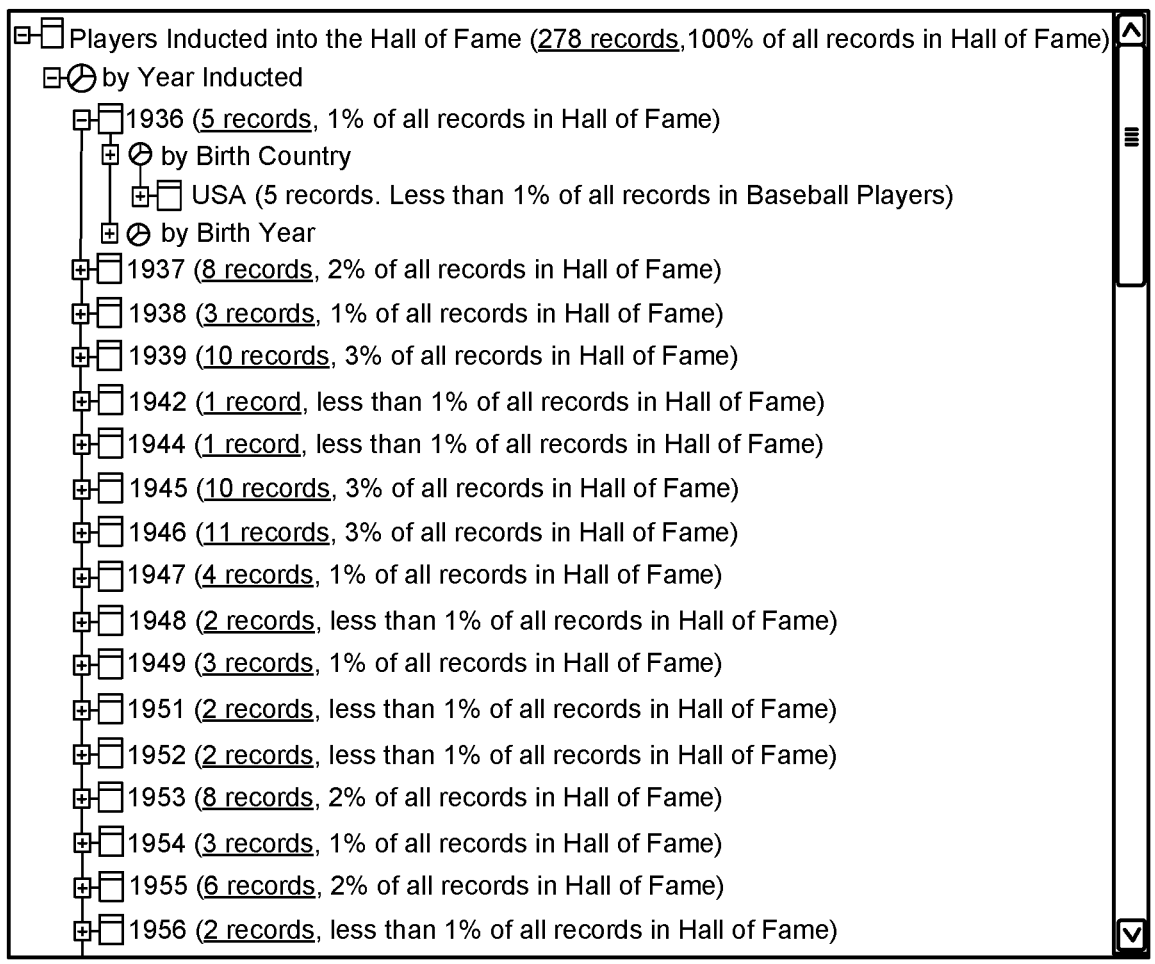
FIG. 5E shows the browsable user interface of FIG. 5A in an example in which the user has selected the parameter node, "Birth Country."

FIG. 5E shows the browsable user interface 106A in an example in which the user has selected the parameter node, "Birth Country." The user may have selected the parameter node, "Birth Country," by clicking on or hovering the cursor over the parameter node, "Birth Country." The value node, "USA", which is a child node of "Birth Country," indicates that all five of the players inducted into the Hall of Fame in 1936 were born in the U.S.A. However, in other examples, multiple value nodes may list all countries in which players were born who were later inducted into the Hall of Fame in a given year, and the number of players born in each of the countries. The "Birth Country" parameter node may be selected for any of the year value nodes, and each birth-Country value resulting from the "Birth Country" variable becomes a value node that is a child node of the "Birth Country" parameter node. The "Birth Country" and "Birth Year" parameter nodes may be displayed for any of the year value nodes 506. The system 100 may display child nodes of each birthCountry value node in response to the user selecting a birthCountry value node.

Figure 5F:
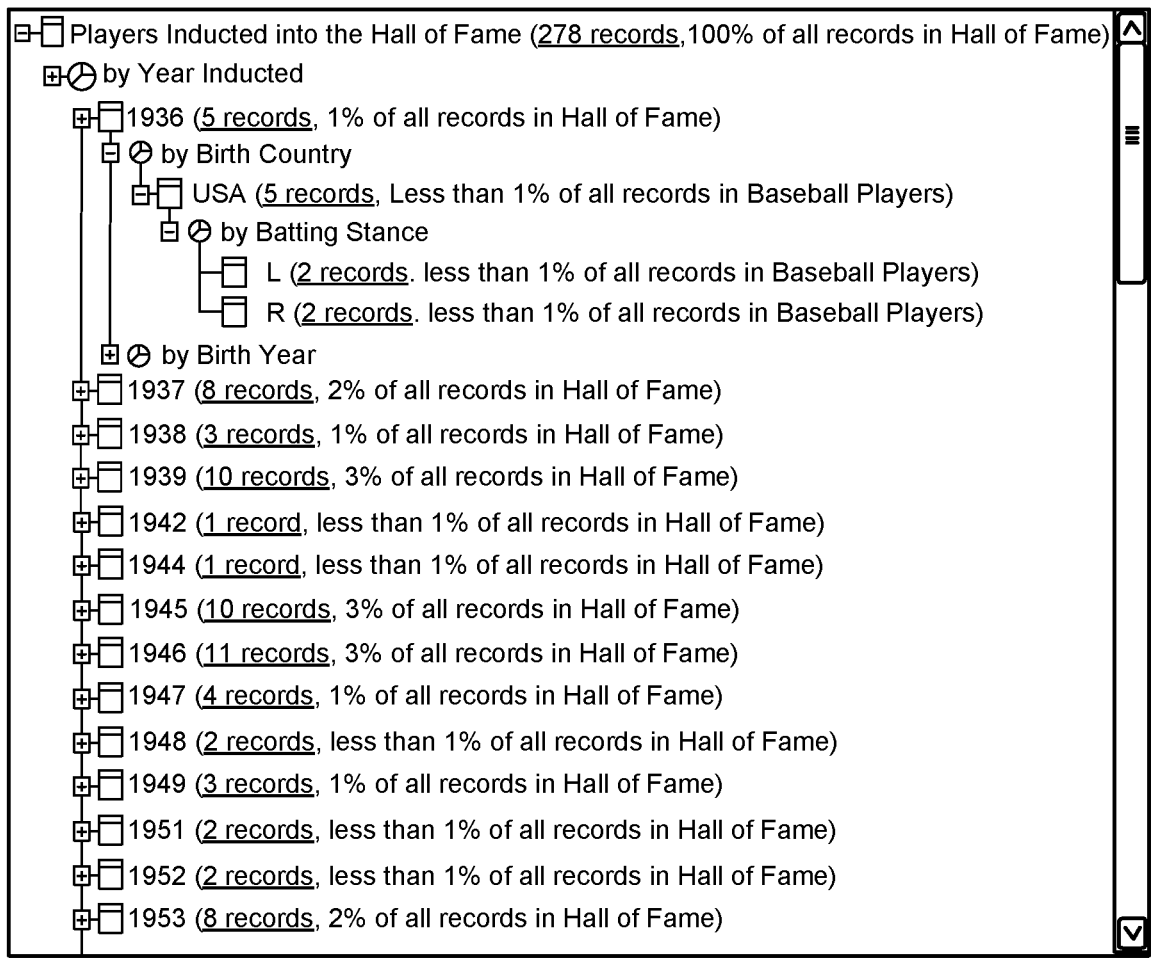
FIG. 5F shows the browsable user interface of FIG. 5A in an example in which the user has selected a parameter node, "by Batting Stance," which is a child of a value node, "U.S.A."

FIG. 5F shows the browsable user interface 106A in an example in which the user has selected the parameter node, "by Batting Stance," which is a child of the value node, "U.S.A." (which in turn is a child node of the parameter node, "by Birth Country"). The parameter node, "by Batting Stance," is a child node of the value node, "U.S.A.," based on the selection of the variable, "bats", at vertex V6 in the query graph 105A of FIG. 4. The browsable user interface 106A displays two child value nodes of the "by Batting Stance" parameter node, namely, "L," representing left-handed batters, and "R," representing right-handed batters. In this example, the browsable user interface 106A indicates that there were two left-handed batters, and two right-handed batters, born in the U.S.A. and inducted into the Hall of Fame in 1936. The lack of a '+' sign at the "L" and "R" value nodes indicates that the subsets may not be further subdivided, i.e., that batting stance is the last parameter by which the subset may be divided, based on the user selection of batting stance at the last vertex V6 with a variable definition in the query graph 105A shown in FIG. 4. The "L" and "R" nodes may be considered terminal or end nodes in the browsable user interface 106, according to an example embodiment.

Figure 5G:
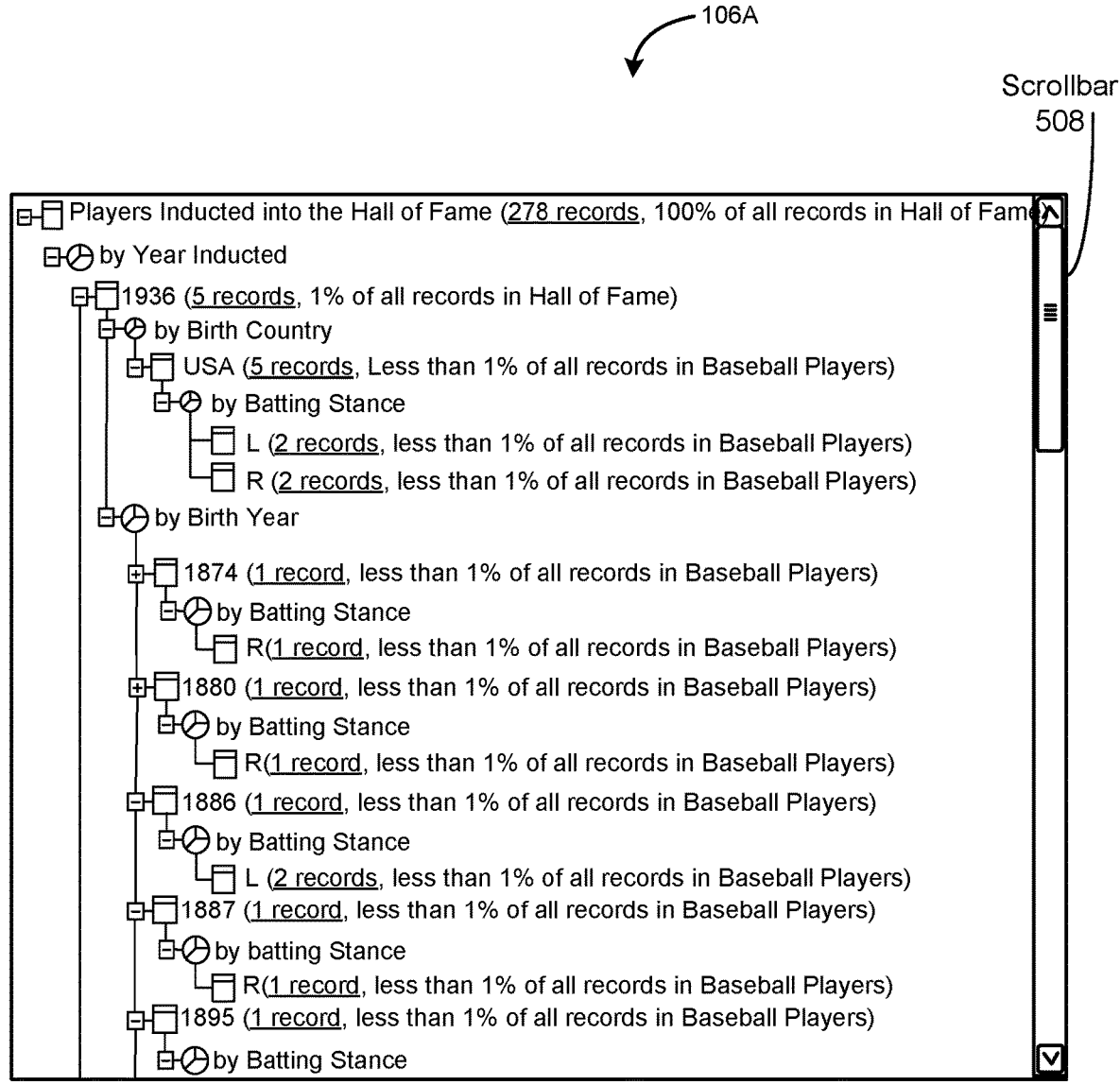
FIG. 5G shows an example of the browsable user interface of FIG. 5A in which the user has selected the year of birth, or, "by Birth Year," as the variable by which to filter the records.

FIG. 5G shows an example of the browsable user interface 106A in which the user has selected year of birth, or, "by Birth Year," as a variable by which to filter the records. In this example, the browsable user interface 106A shows value nodes representing years of birth for players inducted into the Hall of Fame in 1936. The years shown include 1874, 1880, 1886, 1887, and 1895. The user may scroll the scrollbar 508 down to instruct the browsable user interface 106A to show additional years of birth for players who were inducted into the Hall of Fame in 1936. For each birth year, the user has also selected the parameter node, "by Batting Stance," which results in further filtering by batting stance. The parameter node, "by Batting Stance," is a child node of the value node, "by Birth Year," based on the selection of the variable, "bats", at vertex V6 in the query graph 105A of FIG. 4. In the example browsable user interface 106A shown in FIG. 5G each of the birth years for players inducted into the Hall of Fame in 1936 includes only one record. The browsable user interface 106A also shows the batting stance for each of these players born in the indicated years.

Figure 5H:
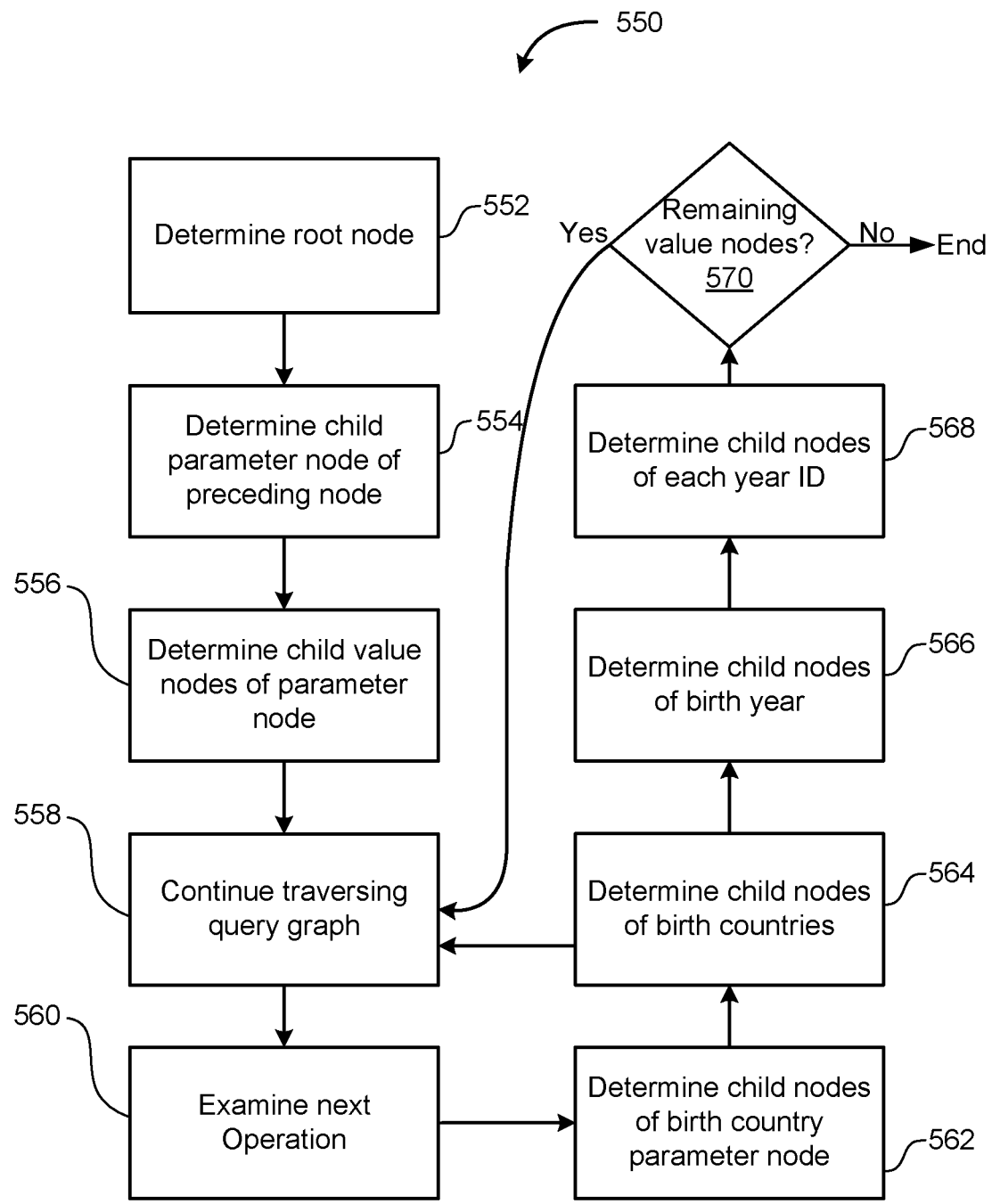
FIG. 5H is a flowchart showing a process for performing the functions described with respect to FIGS. 5A, 5B, 5C, 5D, 5E, 5F, and 5G according to an example embodiment.

FIG. 5H is a flowchart showing a process 550 for performing the functions described above with respect to FIGS. 5A, 5B, 5C, 5D, 5E, 5F, and 5G according to an example embodiment. This process 550 is a specific example of the processes 300, 350 shown and described with respect to FIGS. 3A and 3B. This process 550 is an example of implementing the processes 300, 350 with respect to the query graph 105A shown in FIG. 4.

As discussed above with respect to FIG. 5A, the system 100 determined the root node (552). In the example shown in FIG. 5A, the system 100 determined that the root node 502, "Players Inducted into the Hall of Fame", corresponded to V2, shown in FIG. 4. The system 300 determined the root node (552) according to the process shown in and described with respect to FIG. 3A. The system 100 performed the remaining determinations according to the processes shown in FIG. 3B.

After determining the root node (552), the system 100 determined the child parameter node 504, "by Year Inducted," of the preceding node, in this case the root node 502, "Players Inducted into the Hall of Fame" (554), as discussed above with respect to FIG. 5B. After determining the child parameter node 504, the system determined the child value nodes 506, corresponding to years, of the parameter node 504 (556), as discussed above with respect to FIG. 5C.

Given the n year value nodes, the system 100 determined child nodes for each value node. For each of the n year value nodes, the system iterated through each of the subsequent processes (558, 560, 562, 564, 566, 568) shown in FIG. 5H. If there are no further value nodes (570), then the process 550 may end.

The system 100 continued traversing the query graph 105A shown in FIG. 4 in order of the vertices (558). The next vertex was V4, which had no variables. The system 100 examined the next vertex V5 (560). V5 had two independent variables, "birthCountry" and "birthYear". Because these variables were independent, they resulted in separate parameter nodes, "by Birth Country" and "by Birth Year", which were both child nodes of each year value node, as shown in FIG. 5D.

The system 100 then determined the child nodes of each "birth Country" parameter node (562). This determination of the child nodes of each "birth Country" parameter node (562) entailed repeating the determination of child value nodes of the parameter node (556). However, in this case, the "birth Country" parameter node may have had only one child value node for a specific given "year inducted", "USA", as shown in FIG. 5E.

Given the birthCountry value, the system 100 determined the child nodes of the birth Country value node, "USA" (564). This determination (564) involved a recursive iteration of (558, 560, 562). This determination (564) resulted in a single parameter node, "by Batting Stance," as shown in FIG. 5F.

The system 100 also determined child nodes of the parameter node, "by Birth Year" (566), as shown in FIG. 5G This determination 566 of child nodes of the parameter nodes of the parameter node "by Birth Year" entailed determining the years of birth for players who were inducted into the Hall of Fame in 1936. Each of these years of birth will be represented by value nodes, which also represent the players who were inducted in 1936 and were born in each of the years represented by the value nodes, which have values for the attribute yearID.

After determining the child nodes of "by Birth Year", the system 100 determined the child nodes of each yearID (568). The determination of the child nodes of each yearID (568) involved traversing the query graph 105A for yearID parameter value and finding that the next vertex V6 was associated with the bats. Based on the association of the next vertex V6 with bats, the system generated, for each Birth Year value node, parameter node for Batting Stance. Value nodes representing either left-handed or right-handed extended from the Batting Stance parameter nodes.

Figure 6:
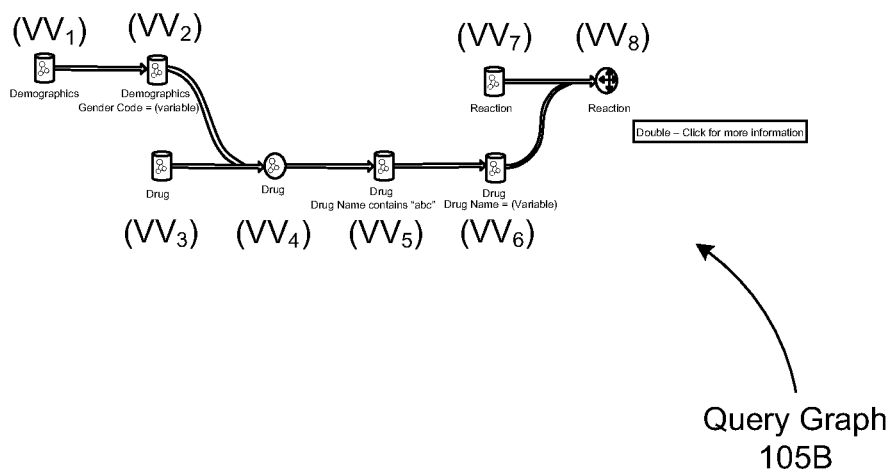
FIG. 6 is a diagram of a query graph according to another example embodiment.

FIG. 6 is a diagram of a query graph 105B according to another example embodiment. The query graph 105B shown in FIG. 6 may have been generated via a user interface, such as the query input user interface 104 shown and described with respect to FIG. 1, or by other means, such as a text-based input approach or providing a computer file to the computing system indicating the relationships between variables associated with a set of records, according to example embodiments.

The example query graph 105B may relate to a query of a data set of medical records. In this example, vertices may be associated with a data set of demographics, which may include records of patients, a data set of records for drugs, and a data set of records for reactions to drugs.

The first vertex VV1 may be considered a root vertex which represents demographics or patient records. The first vertex VV1 may cause the computing system 100 to call a data set, "Demographics." The demographics or patient records will be described further below with respect to FIG. 7A. The computing system 100 may perform operations based on the Demographics data set. The operations to be performed may be based on subsequent or downstream vertices in the query graph 100.

A second vertex VV2 indicates "Gender" as a variable for the Demographics records associated with vertex VV2. Stated differently, this second vertex VV2 represents an operation of filtering on the Demographics records or data set by the "Gender" attribute. The association of the variable, Gender, with the vertex VV2, and the pointing to the vertex VV2 by the vertex VV1, may result in a parameter node in a browsable user interface, based on the query graph 105B shown in FIG. 6, with the parameter node having Gender as the variable for the node and being associated with value nodes with values for the variable Gender. The browsable user interface 106B which results from the query model 105B shown in FIG. 6 is shown and described with respect to FIGS. 8A-E.

The query graph 105B may also include a third vertex VV3, which represents Drug records. This third vertex VV3 may cause the computing system 100 to call a data set, "Drugs." The third vertex VV3 may point into or intersect with the path of the query graph 105, displaying a fourth vertex VV4. The fourth vertex VV4 may represent Drugs. The confluence in the query graph of the path through the fourth vertex VV4 (representing Drugs) and the path through the root or first vertex VV1 (representing Demographics), may indicate or represent a context switch within the progression of the query graph, because Drugs and Demographics are different entities. The vertices with multiple upstream vertices, such as VV4 (for which VV2 and VV3 are upstream) and VV8 (for which VV6 and VV7 are upstream), may represent different types of data from previous upstream nodes, and thus a context switch of the variables.

The context switch may cause operations which are performed based on the query graph 105B at the fourth vertex VV4 (and beyond, unless changed or switched again) to be performed with respect to variables associated with attributes of the Drugs data set rather than variables of the Demographics data set. However, the attributes (or values thereof) of the Drugs data set with respect to which the operations are performed may match or be associated with variables (or values thereof) associated with attributes of the Demographics data set, as will be discussed further below.

In addition to context switching, or determining data sets based upon which operations will be performed, the vertices may prescribe filtering or selecting based on fixed or variable (non-fixed) values. For example, the second vertex VV2 prescribed filtering based on the variable Gender. Because the variable Gender is prescribed as variable (or non-fixed), the resulting browsable user interface will show value nodes for each of the values that the Gender variable may assume—namely, male, female, Unknown, etc. However, if the second vertex VV2 had prescribed filtering based on a fixed value, such as male, then the resulting value node(s) would include only value node(s) which match the prescribed value. In the example where only two genders are available, and one is selected as a fixed value, then only one value node with the selected fixed value would branch or extend from the parameter node.

In the example query graph 105B shown in FIG. 6, a fifth vertex VV5 prescribes that the Drug Name begins with a letter from A-E. As a result of the fixed value prescribing that the Drug name begins with a letter from A-E, a resulting node will include only those Drug records with names that begins with letters from A-E.

In the example query graph 105B shown in FIG. 6, a sixth vertex VV6 prescribes Drug Name as a non-fixed, or variable, attribute for the vertex VV6s. The sixth vertex's VV6 prescription of Drug Name as a non-fixed variable will result in the browsable user interface generating a parameter node representing the variable Drug Name, with value nodes extending from the parameter node with different values which, because of the fifth vertex's VV5 restriction to names that begin with letters from A-E, all begin with letters from A-E.

The example query graph 105B shown in FIG. 6 includes a seventh vertex VV7. The seventh vertex VV7 represents "Reaction" records. The seventh vertex VV7 may cause the computing system 100 to call a "Reaction" data set.

The query graph 105B shown in FIG. 6 may also include an eighth vertex VV8. The eighth vertex VV8 may be extended or pointed into by the vertices VV6, VV7. The eighth vertex VV8 may indicate that an operation will be performed based on Reaction records. This indication that the operation will be performed based on Reaction may represent another context switch. Rather than performing operations based on variables or values associated with attributes of the data sets Demographics or Records, operations may be performed based on variables or values of the data set Reaction.

FIG. 7A is an example table showing Demographic records stored in a database and attributes included in the records according to an example embodiment. The Demographic records may represent patients, and may correspond to the Demographics data set called based on the first vertex VV1 shown in the query graph 105B of FIG. 6. While only seven records are shown in FIG. 7A for illustrative purposes, the Demographics data set may include many more records. The Demographics data set may also include many more attributes than shown in FIG. 7A.

The records included in the Demographics data set may include a Person or identifier attribute. The value for each record for the Person or identifier attribute may include a unique value, such as an integer number, which distinguishes the record from all other records in the Demographics data set.

The records included in the Demographics data set may also include a Gender attribute. The Gender attribute may include one of two values, "M" or "F", representing male or female, respectively (the Gender attribute may also include a 'null' value if the gender is unknown), according to an example embodiment.

The records included in the Demographics data set may also include attributes for drugs taken by the patient. The drugs may be identified by a code number. For each of the drugs, the value may represent whether the patient represented by the record has taken the drug or not. For example, a '0' may indicate that the patient has not taken the identified drug, whereas a '1' may indicate that the patient has taken the drug. While five code numbers representing five different drugs are shown in FIG. 7A, many more code numbers representing many more drugs may be included in the Demographics data set, according to example embodiments.

The records included in the Demographics data set may also include attributes for reactions experienced by the patient. The attributes may each identify a different reaction, and the value for each attribute may indicate whether the identified reaction was experienced by the patient. For example, a '0' may indicate that the patient has not experienced the reaction, whereas a '1' may indicate that the patient has experienced the reaction. While only three reactions are shown as represented by attribute in FIG. 7A, many more reactions may be represented in the Demographics data set, according to example embodiments.

FIG. 7B is an example table showing Drug records stored in a data set or database and attributes included in the records according to an example embodiment. In this example, string values for the attribute Name may indicate the name of the drug record, and integer values for the attribute code number may indicate a code number for the drug record. In an example embodiment, the code numbers of the Drug records may be matched against patients with value '1' for the code number attribute with the same number as the value for the Drug record to determine which patients have taken a given drug.

FIG. 7C is an example table showing Reaction records stored in a database according to an example embodiment. In this example, names of reactions are stored as values for each of the records stored in the Reaction data set. FIG. 7D shows the example table of FIG. 7A with records selected based on a selection based on gender. FIG. 7E shows the example table of FIG. 7A with records selected based on a selection based on gender and on selections associated with the drug records according to an example embodiment. FIG. 7F shows the example table of FIG. 7A with records selected based on selections based on gender and selections associated with the drug records and reaction records according to an example embodiment. FIGS. 7D-F will be discussed further in conjunction with the browsable user interface shown and described with respect to FIGS. 8A-E.

Figure 8A:
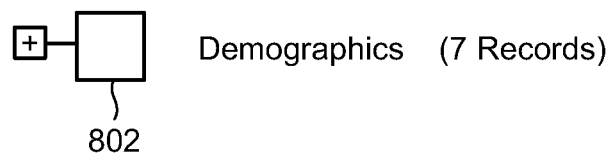
FIG. 8A shows a browsable user interface including a root node including the demographics records shown in the table of FIG. 7A, according to an example embodiment.

FIG. 8A shows a browsable user interface 106B including a root node 802 including the demographics records shown in the table of FIG. 7A, according to an example embodiment. The browsable user interface 106B may have similar features and functionalities as the browsable user interfaces 106, 106B described above. In this example, the computing system 100 may have generated the root node 802 representing the Demographics data set as the root node of the browsable user interface 106B based on the root or first vertex VV1 of the query graph 105B representing the Demographics data set. The computing system 100 may respond to a user clicking on, or hovering a cursor over, the root node 802 by revealing one or more child nodes of the root node 802.

Figure 8B:
FIG. 8B shows the browsable user interface of FIG. 8A with a single child node, which may include a parameter node, of the root node, according to an example embodiment.

FIG. 8B shows the browsable user interface 106B of FIG. 8A with a single child node, which may include a parameter node 804, of the root node 802, according to an example embodiment. In this example, the user may have clicked on the parameter node 802 shown in FIG. 8A, causing the computing system 100 to reveal the parameter node 804. The parameter node 804 may represent Gender, which is an attribute of the Demographics records. The parameter node 804 may represent Gender based on the second vertex VV2 identifying Gender as the variable based upon which an operation should be performed. The computing system 100 may respond to the user clicking on or hovering the cursor over the parameter node 804 by displaying value nodes representing records within the Demographics data set with different values for the attribute Gender.

Figure 8C:
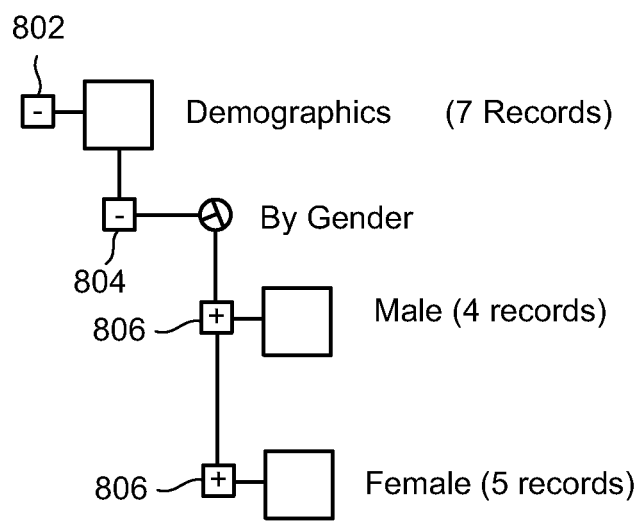
FIG. 8C shows the browsable user interface of FIG. 8A with the value nodes corresponding to specific genders branching from a parameter node, "Gender," according to an example embodiment.

FIG. 8C shows the browsable user interface of FIG. 8A with the value nodes 806 corresponding to specific genders branching from the parameter node 804, "Gender," according to an example embodiment. The computing system 100 may have made the value nodes 806 visible in response to the user clicking on or hovering the cursor over the parameter node 804. The value nodes 806 may represent records within the Demographics data set with values for the attribute Gender indicating that the records representing patients are either male or female. Referring to FIG. 7D, the records or patients identified as 0, 1, 3, and 5, for a total of four records, are represented by the Male value node 806, and the records or patients identified as 2, 4, and 6 are represented by the Female value node 806. If the user clicks on either value node 806, the computing system 100 may respond by displaying parameter nodes for the next operation. Referring back to FIG. 6, because the vertices VV4, VV5, VV6 prescribe operations based on drug name, the subsequent parameter nodes will represent operations based on drug name.

Figure 8D:
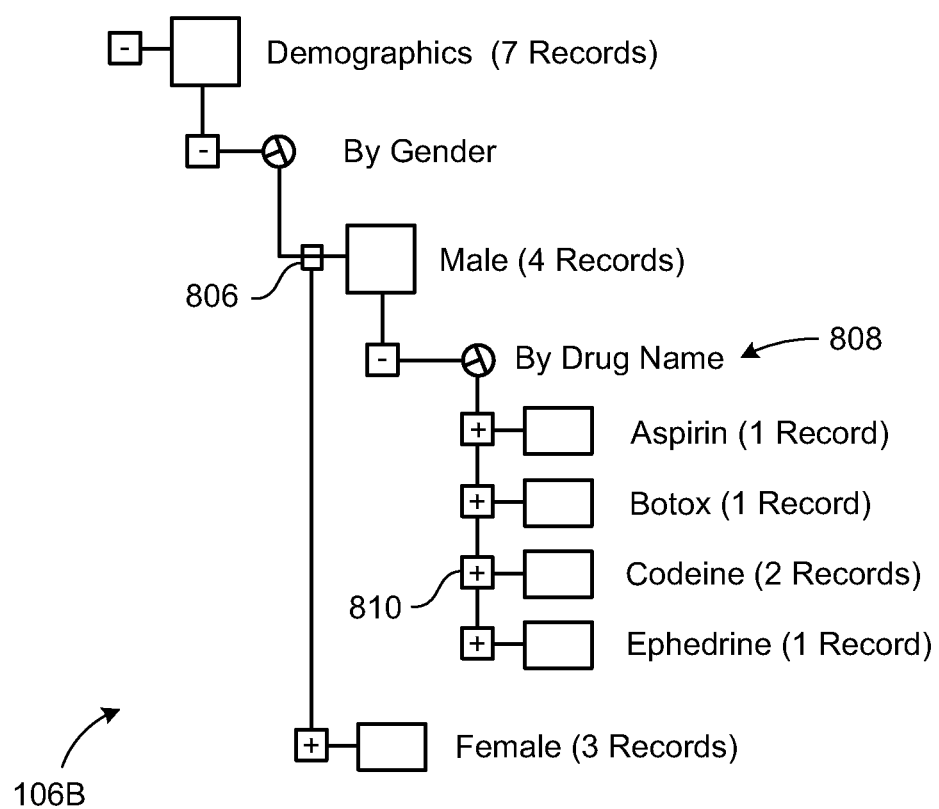
FIG. 8D shows the browsable user interface of FIG. 8A with parameter node, "By Drug Name," as a child node of a value node for the male gender, according to an example embodiment.

FIG. 8D shows the browsable user interface 106B of FIG. 8A with parameter node 808, "By Drug Name," as a child node of a value node 806 for the male gender, according to an example embodiment. In this example, as discussed above with respect to FIG. 6, the computing system 100 has performed a context switch, performing operations based on a variable associated with an attribute, Name, of the Drug records, rather than based on a variable associated with an attribute of the Demographics records.

In this example, the browsable user interface 106B displays, as value nodes of the parameter node 808 By Drug Name, value nodes for four drug names. The four drug names are values of the variable associated with the attribute Name of the Drug records. The number of records for each of the four drug names is based on the number of patients in the Demographics data set which have the value 'M' for Gender (based on the selection of the Male value node 806) and which have the value '1' for the drug with a code number matching the drug name.

As shown in FIG. 7B, each of the unique drug names matches, in one-to-one correspondence, with a unique code number. The code number in the Drugs data set shown in FIG. 7B is used as a value in the Demographics data set shown in FIG. 7A. FIG. 7E shows how the determination of the number of patients who are male and have taken Codeine is determined.

As discussed above, the patients who are male include only those patients with the value 'M' for the variable Gender. To determine which patients have taken the drug Codeine, the computing system 100 finds the value '3' in the code number column to be associated with the name 'Codeine' in the Name column. The computing system 100 will determine the patients who are male and who have taken Codeine by searching for records in the Demographics data set which have the value 'M' for the variable associated with the attribute Gender, and the value '1' for the drug code number 3. Two records or patients, identified as 0 and 5, are found by a) filtering the records in the Demographics data set based on the values for the variable Gender, and b) matching the code number for the drug Codeine shown in the Drug data set with the attributes for the Demographics data set. Similar operations may be performed for the other drugs (Aspirin, Botox, and Ephedrine). Note that browsable user interface 106B shown in FIG. 8D does not display a value node for the drug Dextrose because, as shown in FIG. 7A, no male patients took dextrose. Also note that while FIG. 8C indicated that four male records were included in the Demographics data set, FIG. 8D shows a total of five records (1+1+2+1) appear to be represented by the value nodes which are children of the parameter node 808 By Drug Name, because two male patients (0 and 5) took two different drugs, and one patient (3) took no drugs.

If a user clicks on or hovers a cursor over one of the value nodes representing drugs, such as the value node 810 representing male patients who have taken Codeine, the browsable user interface 106B may display a parameter node for an operation based on the Reaction data set. The next operation may be based on the Reaction data set based on the vertices VV7, VV8 shown in FIG. 6 being associated with the Reaction data set.

Figure 8E:
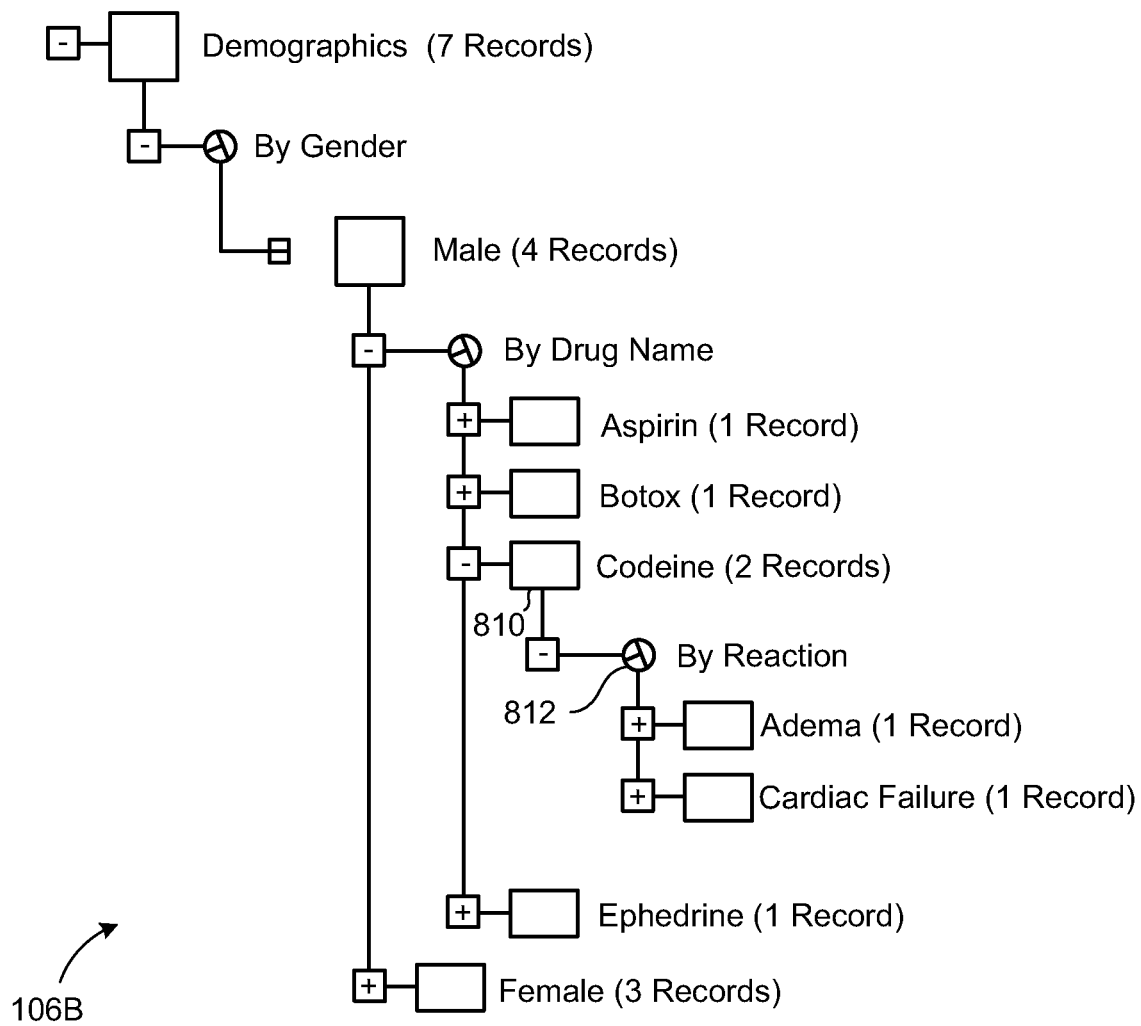
FIG. 8E shows the browsable user interface of FIG. 8A in an example in which the user has selected the value node, "Codeine."

FIG. 8E shows the browsable user interface 106B of FIG. 8D in an example in which the user has selected the value node 810, "Codeine." The computing system 100 may respond to the user clicking on or hovering the cursor over the value node 810 Codeine by displaying the parameter node 812 By Reaction. The computing system 100 may display the parameter node 812 By Reaction based on the vertex VV8, which follows the vertex VV6, being associated with the Reaction data set.

The computing system 100 may perform another context switch when displaying the parameter node 812 By Reaction, and the value nodes Adema and Cardiac Failure extending therefrom. The computing system 100 may perform the context switch based on the vertex VV7 calling a different data set than the preceding vertex VV6 in the path of the query graph 105.

The value nodes branching or extending from the parameter node 812 By Reaction may indicate the number of patients or records from the Demographics data set who are male, have taken Codeine, and have had the identified reaction, based on the selection of the Male value node 806 and Codeine value node 810. FIG. 7F shows how the computing system 100 determines which patients are male, have taken the drug Codeine, and have had Cardiac Failure, according to an example embodiment. As discussed above, the selected records have the value 'M' for the variable Gender based on the selection of the value node 806 Male, and have the value 1 for the code number 3 variable based on the matching of the selected drug Codeine to the code number value 3 in the Drug data set. For the further selection of patients with Cardiac failure, the records have the value '1' for the variable Cardiac Failure, as shown in FIG. 7F, which will show that one patient or record (5) is male, has taken Codeine identified as code number 3, and has had Cardiac Failure. A similar operation may be performed for the other reactions Adema and Pneumonia, substituting the variables with these names for Cardiac failure as a variable which has the value '1'.

Figure 9:
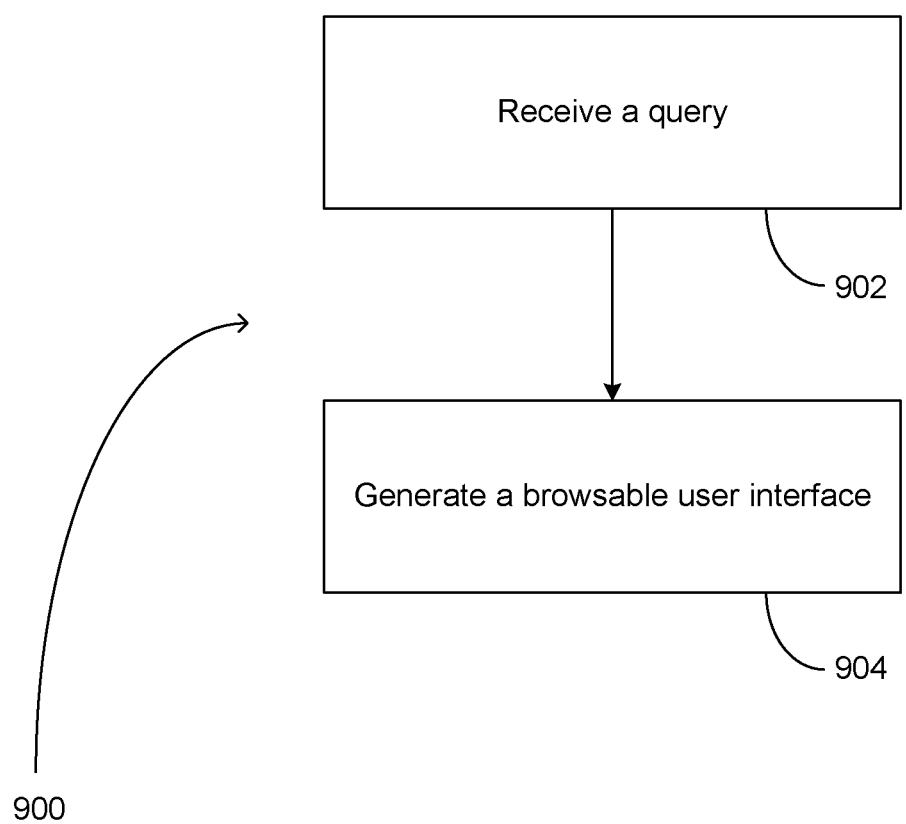
FIG. 9 is a flowchart showing a method according to an example embodiment.

FIG. 9 is a flowchart of a method 900 according to an example embodiment. According to an example embodiment, the method 900 may include receiving, by a computing system, a query for information from a data set (902). The query, regardless of any specific syntax with which the query is defined, may be represented logically, by a query graph having a plurality of vertices, wherein at least a first vertex includes a first variable which can be used to select a first subset of records within the data set that correspond to a value of the first variable. The method 900 may also include generating a browsable user interface to select information in the data set based on the vertices of the query graph (904). The browsable user interface may include a first parameter node corresponding to the first vertex. Selection of the first parameter node may display a plurality of first value nodes representing different subsets of records that correspond to different values of the first variable of the first vertex.

According to an example embodiment, the method 900 may further include displaying a physical representation of the query graph in a query graph graphical user interface. The query graph graphical user interface may include directional indicia connecting the vertices. The directional indicia may indicate an order in which operations represented by the vertices will take place.

According to an example embodiment, the browsable user interface may further include a second parameter node displayed in the browsable user interface, the display of the second parameter node being dependent on a selection of a particular first value node, the second parameter node corresponding to a second vertex in the query graph. In this example, the second vertex may include a second variable that can be used to select a second subset of the records that correspond to a value of the second variables. Also in this example, selection of the second parameter node may display a plurality of second value nodes representing different subsets of records that correspond to different values of the variable of the second vertex and that correspond to the value associated with the particular first value node.

According to an example embodiment, the plurality of first value nodes may include a number of first value nodes equal to a number of different values that records in the data set have for the first variable.

According to an example embodiment, the first value nodes may branch from the first parameter node.

According to an example embodiment, the method 900 may further include receiving a fixed value input for the first variable, the fixed value input selecting a fixed value for the variable, and replacing, by the browsable user interface, the plurality of first value nodes with a single first value node representing a single subset of records that correspond to the fixed value of the first variable of the first vertex.

According to an example embodiment, the method 900 may further include receiving a variable change associated with the first vertex, the variable change removing the first variable from the first vertex and adding a second variable to the first vertex, and wherein, in response to the variable change, the browsable user interface replaces the parameter node in the browsable user interface that corresponds to the first variable with a second parameter node, the second parameter node representing a different subset of records that correspond to the second variable. The second parameter node may be associated with a plurality of second value nodes representing a further sectioning of records that correspond to different values of the second variable, rather than the first variable.

According to an example embodiment, the method 900 may further include filtering, for each of the plurality of first value nodes, the data set based on the value associated with the respective first value node.

According to an example embodiment, the method 900 may further include filtering, for each of the plurality of first value nodes, the data set based on the different values associated with the first variable.

Figure 10:
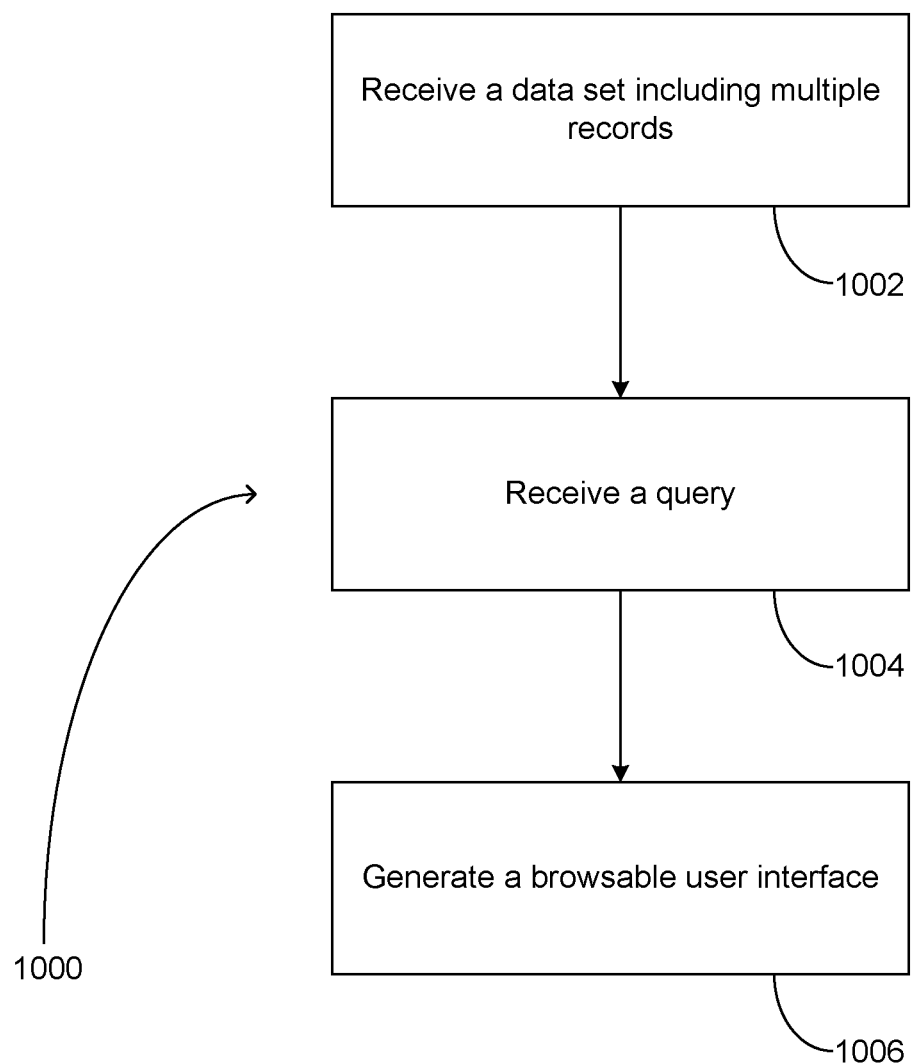
FIG. 10 is a flowchart showing a method according to another example embodiment.

FIG. 10 is a flowchart of a computer-implemented method 1000 according to an example embodiment. In this example, the method 1000 may include receiving, by at least one processor of a computing system, a data set including multiple records, each of the records including attributes (1002). The method 1000 may also include receiving a query for information from the data set, wherein the query is represented logically by a query graph having a plurality of vertices associated with the data set, the plurality of vertices including a first vertex associated with a first variable and a second vertex associated with a second variable (1004). The first variable may be used to select a first subset of the records within the data set that correspond to a value of the first variable, and the second variable may be used to select a second subset of records within the data set that correspond to a value of the second variable. The method 1000 may also include generating a browsable user interface based on the plurality of vertices and associated variables (1006). In an example embodiment, the first and second variables of the query graph may be associated with and/or correspond to first and second attributes of the records.

The browsable user interface may include at least one first level parameter node corresponding to the first vertex, where the first level parameter node represents, in the browsable user interface, the first variable associated with the first vertex. The browsable user interface may also include, for each first level parameter node, a number of associated first level value nodes corresponding to a number of different values that the multiple records may have for the first variable. Each of the first level value nodes may represent records having different values for the first variable (and/or for the second attribute). The first level value nodes may be visible or hidden based on input from a user of the browsable user interface. The browsable user interface may be configured to receive a selection from the user of one or more of the first level value nodes.

The browsable user interface may also include, for each of the selected first level value nodes, at least one associated second level parameter node corresponding to the second vertex, where the second level parameter node corresponds to the second variable associated with the second vertex. The browsable user interface may also include, for each second level parameter node, a number of associated second level value nodes corresponding to a number of different values for the second variable which a second subset of the multiple records have for the second variable (and/or for the second attribute). The second level value nodes may be associated with second subsets of the multiple records, where the second subsets include records which are associated with the first variable value represented by the first level value node with which the second level value node is associated via the second level parameter node. Each of the second level value nodes may represent one of the different values for the second variable. The second level value nodes may be visible or hidden based on input from the user.

According to an example embodiment, the records included in the first subset may have a first entity type. In this example, the records included in the second subset may have a second entity type. In this example, the first subset records of the first entity type may include values for the first variable (and/or attribute) but not the second variable (and/or attribute). In this example, the second subset of records of the second entity type may include values for the second variable (and/or attribute) but not for the first variable (and/or attribute).

According to an example embodiment, the records included in the first and second subsets may have a same entity type and include values for identical attributes.

According to an example embodiment, each of the first level value nodes may indicate a number of records from the first subset which have the value represented by the first level value node for the first variable. In this example, each of the second level value nodes may indicate a number of records from the second subset which are associated with the value represented by the second level value node for the second variable.

According to an example embodiment, the browsable user interface may include a tree-based hierarchy. In the tree-based hierarchy, the first level value nodes may branch from the at least one first level parameter node, the second level parameter nodes may branch from their associated first level value nodes, and the second level value nodes may branch from their associated second level parameter nodes.

According to an example embodiment, the method 1000 may include generating a query input user interface including the plurality of vertices associated with the data set, the query input user interface being configured to receive input from the user indicating one or more variables associated with one or more of the vertices.

According to an example embodiment, the query input user interface may include directional indicia connecting the vertices, the directional indicia pointing in a direction from a source vertex of the vertices to a destination vertex of the vertices.

According to an example embodiment, the method 1000 may further include toggling the first level value nodes between visible or hidden states based on interaction by the user with the first level parameter node, and toggling the second level value nodes based on interaction by the user with the second level value node.

According to an example embodiment, the method 1000 may further include toggling the second level parameter nodes between hidden and visible states based on interaction by the user with their associated first level value nodes.

According to an example embodiment, the plurality of vertices in the query graph may include at least the first vertex associated with the first variable of the records, the second vertex associated with the second variable of the records, and a third vertex associated with a third variable of the records. In this example, the browsable user interface may include the at least one first level parameter node corresponding to the first vertex, the at least one first level parameter node representing the first variable associated with the first vertex, and for each first level parameter node, the number of associated first level value nodes based on the number of different values which the first subset of the multiple records have for the first value represented by the first level parameter node. In this example, each of the first level value nodes may represent one of the different values for the first value represented by the first level parameter node, the first level value nodes may be visible or hidden based on input from the user of the browsable user interface, and the browsable user interface may be configured to receive the selection from the user of one or more of the first level value nodes. In this example, the browsable user interface may include, for each of the selected first level value nodes, the at least one associated second level parameter node corresponding to the second vertex, and the at least one second level parameter node representing the second variable associated with the second vertex. The browsable user interface may also include, for each second level parameter node, the number of associated second level value nodes based on a number of different values for the second value represented by the second parameter node which are associated with the second subset of the multiple records. In this example, the second subset may include records which are associated with the value represented by the first level value node with which the second level value node is associated via the second level parameter node, each of the second level value nodes may represent one of the different values for the second value, the second level value nodes may be visible or hidden based on input from the user, and the browsable user interface may be configured to receive a selection from the user of one or more of the second level value nodes. The browsable user interface may also include, for each of the selected second level value nodes, at least one associated third level parameter node corresponding to the third vertex, the at least one third level parameter node representing the third variable associated with the third vertex, and, for each third level parameter node, a number of associated third level value nodes based on a number of different values for the third value represented by the third parameter node which are associated with a third subset of the multiple records. The third subset may include records which are associated with the value represented by the first level value node with which the third level value node is associated via the associated third level parameter node, second level value node, and second level parameter node. The value represented by the second level value node with which the third level value node may associated via the third level parameter node. Each of the third level value nodes may represent one of the different values for the third variable (and/or attribute), and the third level value nodes may be visible or hidden based on input from the user.

According to an example embodiment, the first subset may include records from the multiple records having a first entity type. The second subset may include records from the multiple records having a second entity type, the second entity type having different values than the first entity type. The third subset may include records from the multiple records having a third entity type, the third entity type having different values than the first entity type and different values than the second entity type. Each of the first level value nodes may indicate the number of records, from the first subset having the first entity type, which have the value represented by the respective first level value node for the first value. Each of the second level value nodes may indicate the number of records, from the second subset of the multiple records having the first entity type, which have the value represented by the associated first level value node for the first value, and match the value represented by the respective second level value node for the second value. Each of the third level value nodes may indicate the number of records, from the first subset of the multiple records having the first entity type, which have the value represented by the associated first level value node for the first variable, match the value represented by the associated second level value node for the second variable, and match the value represented by the respective third value node for the third variable.

Figure 11:
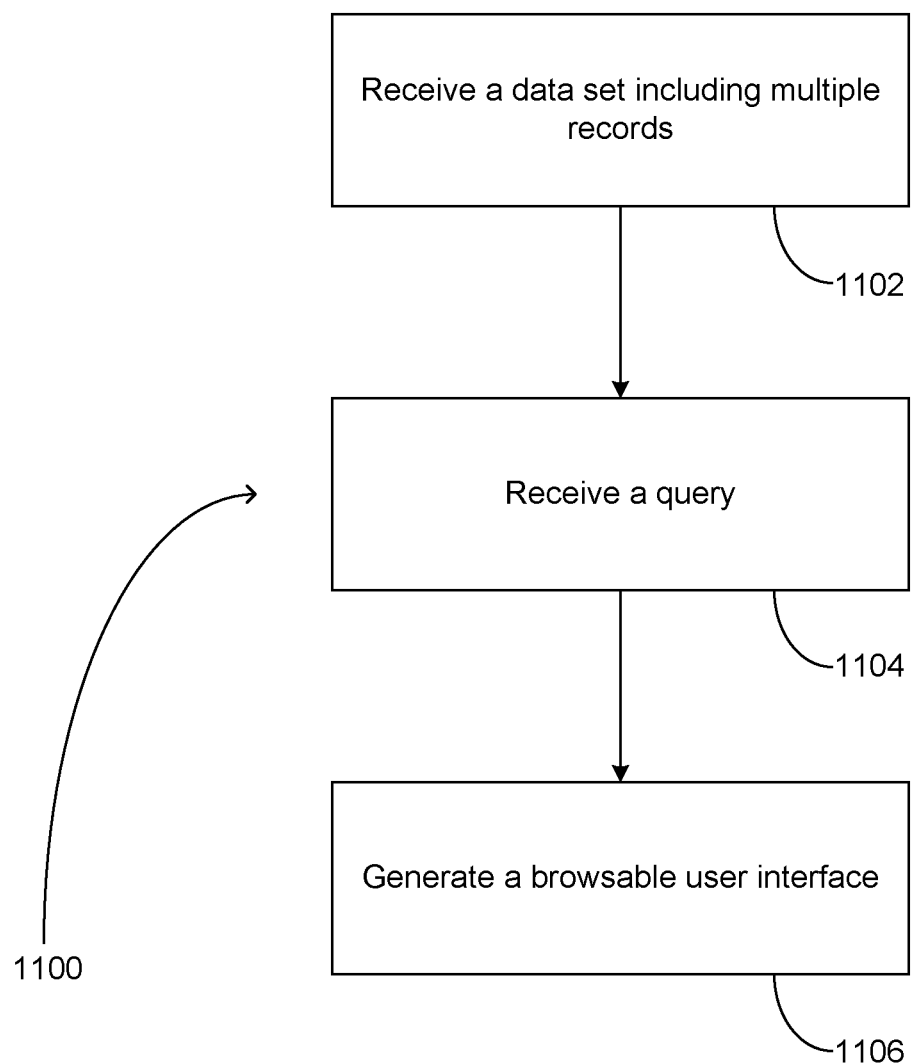
FIG. 11 is a flowchart showing a method according to another example embodiment.

FIG. 11 is a flowchart of a method 1100 according to an example embodiment. In this example, the method 1100 may include maintaining, receiving, or reading, by a computing system 100, a data set including multiple records 108. Each of the records 108 may include multiple attributes 114 (1102). The method 1100 may also include generating, receiving, or processing a query, which may be logically represented by query graph 105 including a plurality of vertices 110 (1104). The query graph 105 may have been generated using a query input user interface 104 or query module 122 which receives input from a user indicating one or more variables associated with one or more of the vertices 110. The variables of the query graph may be associated with attributes of the records, according to an example embodiment.

The method 1100 may also include generating a browsable user interface 106 (1106). The browsable user interface 106 may include a number of parameter nodes 112, 504 based on (such as equal to) the number of vertices 110 for which the user indicated one or more variables. Each of the parameter nodes 112, 504 may be associated with one of a plurality of subsets 202, 204 of the multiple records 108. For each of the parameter nodes 112, 504, the browsable user interface 106 may include a number of value nodes 506 based on (such as equal to) a number of different values for the underlying data set, given the indicated variable associated with attribute 114 of the subset of the multiple records associated with the parameter node 112, 504.

According to an example embodiment, the query graph 105 may include directional indicia, such as edges and/or arrows, connecting the vertices 110, the directional indicia pointing in a direction from a source vertex 110A of the vertices 110 to a destination vertex 110D of the vertices 110.

According to an example embodiment, the method 1100 may further include filtering the records 108 based on each of the indicated variables associated with attributes 114 to generate each of the subsets of the multiple records associated with the parameter nodes 112, 504.

According to an example embodiment, the browsable user interface 106 may include a tree-based hierarchy including the value nodes 506 branching from the parameter nodes 112, 504.

According to an example embodiment, the browsable user interface 106 may be configured to display the value nodes 506 for a parameter node 112 over which the user moves a cursor.

According to an example embodiment, the browsable user interface 106 may be configured to display the value nodes 506 for a parameter node 112, 504 on which the user clicks a mouse.

According to an example embodiment, the browsable user interface 106 may be further configured to display the value of the indicated attribute 114 for each of the displayed value nodes 506.

According to an example embodiment, the browsable user interface 106 may further include branches from each of the parameter nodes 112, 504 to their respective value nodes 506. Each of the branches may indicate the number of records 108 in the respective subset 202, 204 having the value represented by the respective value node 506.

According to an example embodiment, the browsable user interface 106 may be configured to receive toggling input from the user at each parameter node 112, 504. The toggling input may toggle the browsable user interface 106 to display or hide the value nodes 506 corresponding to, or branching from, the parameter node 112, 504.

Figure 12:
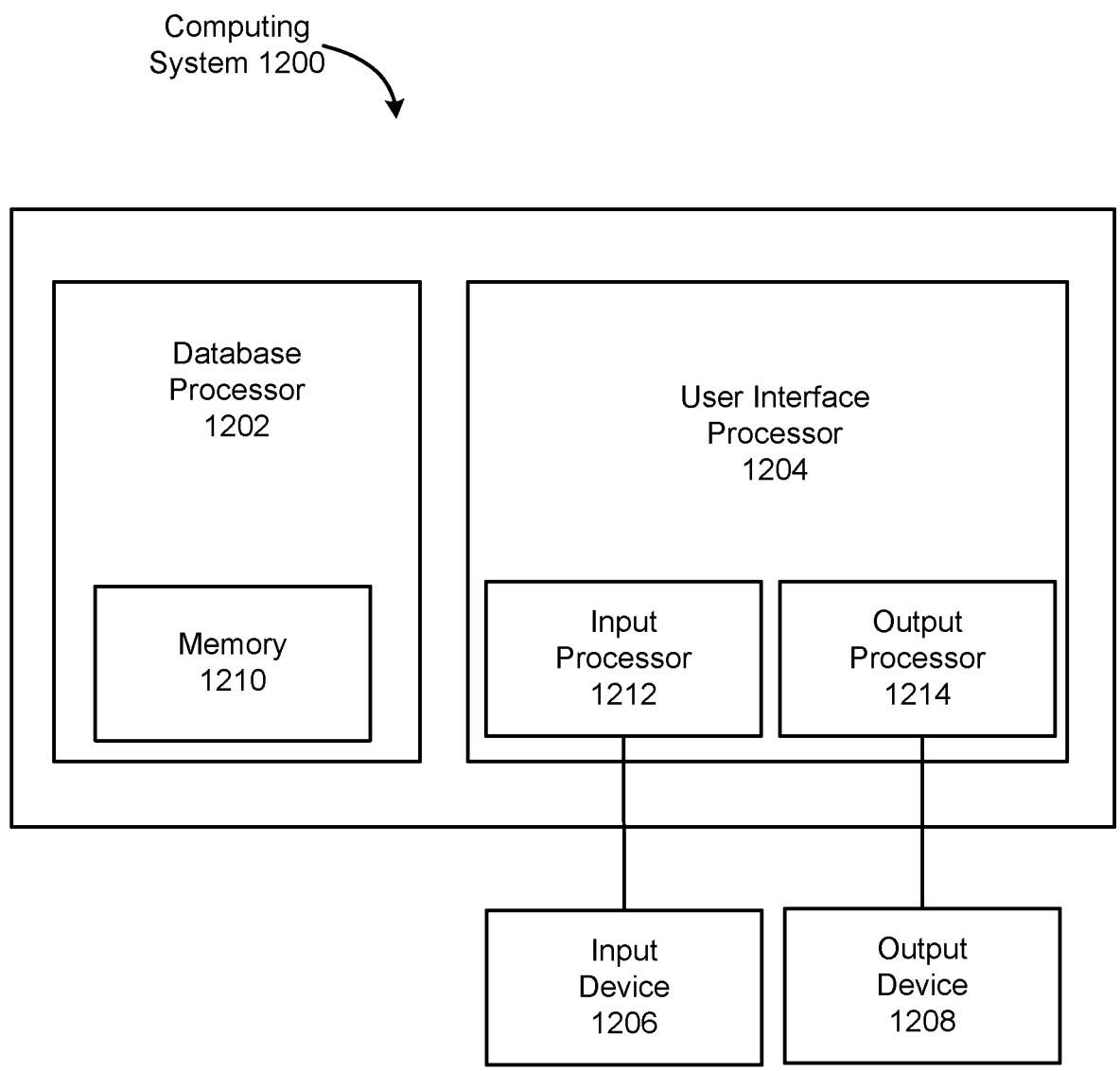
FIG. 12 is a block diagram showing a computing system in which the system and processes described herein may be implemented.

FIG. 12 is a block diagram showing a computing system 1200 in which the system 100 shown in FIG. 1, and processes described herein, may be implemented. The computing system 1200 may include a database processor 1202 and a user interface processor 1204 according to an example embodiment. In this example, the database processor 1202 may maintain the records 108. Each of the records 108 may have values 120 corresponding to each of the attributes 114, as described and shown above with respect to FIG. 2. The database processor 1202 may filter the records 108 in the database 102 (shown in FIG. 1) in the subsets based on the selections of the variables associated with attributes 114 by the user. The database processor 1202 may also determine a number of records 108 for each of the subsets. The user interface processor 1204 may present the vertices to the user, which allows the user to select each of the variables associated with attributes 114 according to which the records 108 will be filtered.

The computing system 1200 may communicate via an input device 1206 and output device 1208. The input device 1206 may receive input from the user and provide the input to the user interface processor 1204 of the computing system 1200. The input device 1206 may include, for example, a keyboard, a mouse, a microphone, or a touch screen, as non-limiting examples. The user interface processor 1204 of the computing system 1200 may provide output to the user via the output device 1208. The output device 1208 may include, for example, a display such as a flat screen, plasma, or LCD display, a printer, or an output device which provides an output to a remote device, such as via the Internet, as non-limiting examples.

The database processor 1202 may include a memory 1210. The memory 1210 may include any form of memory, such as a hard disk, DRAM, SRAM, or flash memory, as non-limiting examples, and may store the database records 108. The user interface processor 1204 may include an input processor 1212 and an output processor 1214. The input processor 1212 may receive and process the input received from the input device 1206. The output processor 1214 may generate and provide the output to the output device 1208.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method for visualizing relationships between values stored in a plurality of fields of a plurality of records of a data set, wherein each record of the plurality of records consists of a same plurality of fields and each field is identified by a unique attribute, the method comprising steps of:

on a computing device having access to the data set:
selecting, by a user, a hierarchy of at least three fields from the plurality of fields;
defining, for each of the at least three fields of the selected hierarchy, a plurality of subsets of the plurality of records, each subset having same values stored in the respective plurality of fields;
generating and displaying an interface having the at least three fields of the defined hierarchy including
(i) parameter nodes for naming the attributes of the at least three fields of the defined hierarchy, and
(ii) value nodes naming the same values in the field of the respective plurality of subsets named by the parameter nodes, wherein the value nodes are nested under the corresponding parameter nodes;
receiving, from the user, a request to expand the parameter nodes and the value nodes; and
(i) in response to the received request for expansion of the parameter nodes, displaying on the interface the value nodes nested under the parameter nodes and an indication of a number of records corresponding to the same values in the respective plurality of subsets and further including additional parameter nodes nested under the value nodes, and
(ii) in response to the received request for the expansion of value nodes,
   (a) rearranging the selected hierarchy of the at least three fields from the plurality of fields, and
   (b) displaying on the interface the parameter nodes nested under the requested value nodes, wherein at least two of the value nodes have more than one record for the same value.

2. The method of claim 1, wherein each of the displayed value nodes indicates the number of records a proportion of the records corresponding to the same value represented in the data set.

3. The method of claim 1, wherein the displaying includes directional indicia connecting the value nodes, the indicia indicating a hierarchical order of the parameter nodes and value nodes.

4. A system for visualizing relationships between values stored in a plurality of fields of a plurality of records of a data set, wherein each of the plurality of records consists of a same plurality of fields and each field is identified by a unique attribute, the system comprising:
provide a computing device having access to the data set and configured to:
select, by a user, a hierarchy of fields from the plurality of fields;
define, for each of the fields of the selected hierarchy, a plurality of subsets of the plurality of records, each subset having same values stored in the respective plurality of fields;
generate and display an interface having the plurality of fields of the defined hierarchy including
   (i) parameter nodes for naming the attributes of the at least three fields of the defined hierarchy, and
   (ii) value nodes naming the same values in the field of the respective plurality of subsets named by the parameter nodes, wherein the value nodes are nested under the corresponding parameter nodes;
receive, from the user, a request to expand the parameter nodes and the value nodes; and
(i) in response to the received request for expansion of the parameter nodes, display on the interface the value nodes nested under the parameter nodes and an indication of a number of records corresponding to the same values in the respective plurality of subsets and further including additional parameter nodes nested under the value nodes, and
(ii) in response to the received request for expansion of the value nodes,
   (a) rearrange the selected hierarchy of the at least three fields from the plurality of fields, and
   (b) display on the interface the parameter nodes nested under the requested value nodes, wherein at least two of the value nodes have more than one record for the same value.

5. The method of claim 1, wherein the interface is browsable and the additional nested parameter nodes branch from at least one of the value nodes within the interface.

6. The method of claim 5, wherein the interface comprises at least one upstream node of the value nodes, the at least one upstream node preceding the additional parameter nodes.

7. The method of claim 6, further comprising the steps of:
replacing at least one of the value nodes with a first value of the plurality of subsets; and replacing, within the interface, the additional parameter nodes with a single parameter node representing a single subset of the plurality of records having fields that correspond to the first value.

8. The method of claim 7, further comprising the steps of:
replacing the first value with a second value of the plurality of subsets; and in response
replacing, within the interface the value nodes with second value nodes, the second value nodes representing records that correspond to different values than the record representing the value nodes.

9. The method of claim 1, further comprising a step of filtering, for each node of the value nodes, the plurality of records based on a value of the plurality of subsets associated with the respective node.

10. The method of claim 1, further comprising a step of filtering, for each node of the value nodes, the plurality of records based on different values of the plurality of subsets.

11. A non-transitory computer-readable medium comprising computer executable code, the code, when executed by at least one processor, is configured to perform a method of visualizing relationships between values stored in a plurality of fields of a plurality of records of a data set, wherein each record of the plurality of records consists of a same plurality of fields and each field is identified by a unique attribute, the method comprising steps of:
on a computing device having access to the data set:
selecting, by a user, a hierarchy of at least three fields from the plurality of fields;
defining, for each of the at least three fields of the selected hierarchy, a plurality of subsets of the plurality of records, each subset having same values stored in the respective plurality of fields;
generating and displaying an interface having at least three fields of the defined hierarchy including
   (i) parameter nodes for naming the attributes of the at least three fields of the defined hierarchy, and
   (ii) value nodes naming the same values in the field of the respective plurality of subsets named by the parameter nodes, wherein the value nodes are nested under the corresponding parameter nodes;
receiving, from the user, a request to expand the parameter nodes and the value nodes; and
(i) in response to the received request for expansion of the parameter nodes, displaying on the interface the value nodes nested under the parameter nodes and an indication of a number of records corresponding to the same values in the respective plurality of subsets and further including additional parameter nodes nested under the value nodes, and
(ii) in response to the received request for expansion of the value nodes,
   (a) rearranging the selected hierarchy of the at least three fields from the plurality of fields, and
   (b) displaying on the interface the parameter nodes nested under the requested value nodes, wherein at least two of the value nodes have more than one record for the same value.

12. The method of claim 1, further comprising steps of:
performing a context switch from a subset of the plurality of records to a second subset of the plurality of records within the data set; and
re-generating the interface based on the second subset of records.

* * * * *

UNITED STATES PATENT AND TRADEMARK OFFICE
CERTIFICATE OF CORRECTION

PATENT NO. : 10,860,163 B1  
APPLICATION NO. : 15/078656  
DATED : December 8, 2020  
INVENTOR(S) : Brocato Page 1 of 1

It is certified that error appears in the above-identified patent and that said Letters Patent is hereby corrected as shown below:

On the Title Page

Page 2, Item (56), Column 2, under "References Cited – OTHER PUBLICATIONS", Line 5, after "Action", delete repetitive word "Received".

Page 2, Item (56), Column 2, under "References Cited – OTHER PUBLICATIONS", Line 9, after "Action", delete "mailed".

Page 2, Item (56), Column 2, under "References Cited – OTHER PUBLICATIONS", Line 13, after "Action", delete repetitive word "Received".

Page 2, Item (56), Column 2, under "References Cited – OTHER PUBLICATIONS", Line 17, after "Allowance", delete repetitive word "Received".

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*